US009615139B2

(12) United States Patent
Rodriguez et al.

(10) Patent No.: US 9,615,139 B2
(45) Date of Patent: Apr. 4, 2017

(54) DETERMINING DEVICE THAT PERFORMS PROCESSING OF OUTPUT PICTURES

(75) Inventors: Arturo A. Rodriguez, Norcross, GA (US); Robert O. Banker, Cumming, GA (US); Darryl S. Delacruz, San Jose, CA (US); David B. Lett, Duluth, GA (US); Ajith N. Nair, Lawrenceville, GA (US); James W. Kiker, Duluth, GA (US)

(73) Assignee: TECH 5, Issy les Moulineaux (FR)

( * ) Notice: Subject to any disclaimer, the term of this patent is extended or adjusted under 35 U.S.C. 154(b) by 1372 days.

(21) Appl. No.: 13/438,511

(22) Filed: Apr. 3, 2012

(65) Prior Publication Data

US 2012/0188445 A1   Jul. 26, 2012

Related U.S. Application Data

(62) Division of application No. 10/761,777, filed on Jan. 21, 2004, now Pat. No. 8,161,388.

(51) Int. Cl.
| | |
|---|---|
| *G06F 3/048* | (2013.01) |
| *H04N 21/485* | (2011.01) |
| *G06F 3/14* | (2006.01) |
| *H04N 21/41* | (2011.01) |
| *H04N 21/4147* | (2011.01) |

(Continued)

(52) U.S. Cl.
CPC ......... *H04N 21/4854* (2013.01); *G06F 3/14* (2013.01); *H04N 21/4122* (2013.01); *H04N 21/4147* (2013.01); *H04N 21/42204* (2013.01); *H04N 21/4402* (2013.01); *H04N 21/440263* (2013.01); *H04N 21/4758* (2013.01); *G09G 2340/14* (2013.01); *G09G 2360/02* (2013.01);

(Continued)

(58) Field of Classification Search
CPC .............. H04N 7/147; H04N 21/4854; H04N 21/4122; G09G 5/006; G06F 3/14
USPC ....................................................... 345/204
See application file for complete search history.

(56) References Cited

U.S. PATENT DOCUMENTS

| | | |
|---|---|---|
| 3,676,580 A | 7/1972 | Beck |
| 4,528,643 A | 7/1985 | Freeny |

(Continued)

FOREIGN PATENT DOCUMENTS

| | | |
|---|---|---|
| CA | 2 363 052 A1 | 11/1995 |
| CA | 2 223 025 C | 11/2001 |

(Continued)

OTHER PUBLICATIONS

U.S. Appl. No. 11/170,348, filed Jun. 29, 2005 entitled "Methods and Systems for Advertising During Video-on-Demand Suspensions".

(Continued)

*Primary Examiner* — Andrey Belousov
(74) *Attorney, Agent, or Firm* — Brian J. Dorini; Jerome G. Schaefer

(57) ABSTRACT

A system and method for determining the characteristics of a device coupled to a client device are disclosed. A method, according to one embodiment, includes driving a display device with a first video output signal formatted according to a first video interface specification; responsive to driving the display device, soliciting user input based on information included in the first video output signal; determining a characteristic of the display device based on the user input; and driving the display device according to the determined characteristic.

17 Claims, 8 Drawing Sheets

(51) Int. Cl.
*H04N 21/422* (2011.01)
*H04N 21/4402* (2011.01)
*H04N 21/475* (2011.01)
*H04N 5/44* (2011.01)
*H04N 5/46* (2006.01)
*H04N 7/01* (2006.01)

(52) U.S. Cl.
CPC ............ *H04N 5/4401* (2013.01); *H04N 5/46* (2013.01); *H04N 7/0122* (2013.01); *H04N 2005/4412* (2013.01)

(56) References Cited

U.S. PATENT DOCUMENTS

| | | |
|---|---|---|
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,438,423 A | 8/1995 | Lynch et al. |
| 5,448,313 A | 9/1995 | Kim et al. |
| 5,465,120 A | 11/1995 | Schultheiss |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,483,278 A | 1/1996 | Strubbe et al. |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,524,195 A | 6/1996 | Clanton et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,565,908 A | 10/1996 | Ahmad |
| 5,568,181 A | 10/1996 | Greenwood et al. |
| 5,568,272 A | 10/1996 | Levine |
| 5,568,785 A | 10/1996 | Hazen |
| 5,579,055 A | 11/1996 | Hamilton |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,604,528 A | 2/1997 | Edwards et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,629,733 A | 5/1997 | Youman et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,654,747 A | 8/1997 | Ottesen et al. |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,677,905 A | 10/1997 | Bigham et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,163 A | 12/1997 | Harrison |
| 5,694,176 A | 12/1997 | Bruette et al. |
| 5,694,546 A | 12/1997 | Reisman |
| 5,696,905 A | 12/1997 | Reimer et al. |
| 5,696,906 A | 12/1997 | Peters et al. |
| 5,699,107 A | 12/1997 | Lawler et al. |
| 5,710,591 A | 1/1998 | Bruno et al. |
| 5,715,169 A | 2/1998 | Noguchi |
| 5,715,515 A | 2/1998 | Akins, III et al. |
| 5,717,468 A | 2/1998 | Baryla |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,758,257 A | 5/1998 | Herz et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |

(56) References Cited

U.S. PATENT DOCUMENTS

| | | |
|---|---|---|
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,102 A | 10/1998 | Escobar et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,881 A | 1/1999 | Freeman et al. |
| 5,861,906 A | 1/1999 | Dunn et al. |
| 5,877,755 A | 3/1999 | Hellhake |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,865 A | 5/1999 | Palmer et al. |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,973,685 A | 10/1999 | Schaffa et al. |
| 5,978,043 A | 11/1999 | Blonstein et al. |
| 5,978,381 A | 11/1999 | Perlman et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 5,996,015 A | 11/1999 | Day et al. |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |
| 6,008,803 A | 12/1999 | Rowe et al. |
| 6,008,836 A * | 12/1999 | Bruck .................... H04N 7/147 348/E5.002 |
| 6,014,184 A | 1/2000 | Knee et al. |
| 6,014,694 A | 1/2000 | Aharoni et al. |
| 6,014,727 A | 1/2000 | Creemer |
| 6,016,348 A | 1/2000 | Blatter et al. |
| 6,018,359 A | 1/2000 | Kermode et al. |
| 6,018,372 A | 1/2000 | Etheredge |
| 6,020,912 A | 2/2000 | De Lang |
| 6,023,267 A | 2/2000 | Chapuis et al. |
| 6,025,837 A | 2/2000 | Matthews, III et al. |
| 6,025,868 A | 2/2000 | Russo |
| 6,025,869 A | 2/2000 | Stas et al. |
| 6,026,376 A | 2/2000 | Kenney |
| 6,034,677 A | 3/2000 | Noguchi et al. |
| 6,035,281 A | 3/2000 | Crosskey et al. |
| 6,037,933 A | 3/2000 | Blonstein et al. |
| 6,049,831 A | 4/2000 | Gardell et al. |
| 6,055,571 A | 4/2000 | Fulp et al. |
| 6,057,872 A | 5/2000 | Candelore |
| 6,061,097 A | 5/2000 | Satterfield |
| 6,064,380 A | 5/2000 | Swenson et al. |
| 6,064,980 A | 5/2000 | Jacobi et al. |
| 6,070,186 A | 5/2000 | Nishio |
| 6,072,982 A | 6/2000 | Haddad |
| 6,073,105 A | 6/2000 | Sutcliffe et al. |
| 6,075,575 A | 6/2000 | Schein et al. |
| 6,081,263 A | 6/2000 | LeGall et al. |
| 6,081,830 A | 6/2000 | Schindler |
| 6,085,185 A | 7/2000 | Matsuzawa et al. |
| 6,088,455 A | 7/2000 | Logan et al. |
| 6,094,680 A | 7/2000 | Hokanson |
| 6,097,383 A | 8/2000 | Gaughan et al. |
| 6,098,082 A | 8/2000 | Gibbon et al. |
| 6,100,883 A | 8/2000 | Hoarty |
| 6,101,512 A | 8/2000 | DeRose et al. |
| 6,108,002 A | 8/2000 | Ishizaki |
| 6,108,042 A | 8/2000 | Adams et al. |
| 6,108,706 A | 8/2000 | Birdwell et al. |
| 6,118,445 A | 9/2000 | Nonomura et al. |
| 6,118,498 A | 9/2000 | Reitmeier |
| 6,118,976 A | 9/2000 | Arias et al. |
| 6,119,163 A | 9/2000 | Monteiro et al. |
| 6,124,878 A | 9/2000 | Adams et al. |
| 6,125,259 A | 9/2000 | Perlman |
| 6,130,726 A | 10/2000 | Darbee et al. |
| 6,133,909 A | 10/2000 | Schein et al. |
| 6,137,539 A | 10/2000 | Lownes et al. |
| 6,138,139 A | 10/2000 | Beck et al. |
| 6,141,003 A | 10/2000 | Chor et al. |
| 6,141,488 A | 10/2000 | Knudson et al. |
| 6,145,083 A | 11/2000 | Shaffer et al. |
| 6,148,332 A | 11/2000 | Brewer et al. |
| 6,151,059 A | 11/2000 | Schein et al. |
| 6,151,688 A | 11/2000 | Wipfel et al. |
| 6,157,377 A | 12/2000 | Shah-Nazaroff et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,989 A | 12/2000 | Hendricks et al. |
| 6,163,272 A | 12/2000 | Goode et al. |
| 6,166,730 A | 12/2000 | Goode et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,333 B1 | 1/2001 | Chaney et al. |
| 6,181,693 B1 | 1/2001 | Maresca |
| 6,182,287 B1 | 1/2001 | Schneidewend et al. |
| 6,184,877 B1 | 2/2001 | Dodson et al. |
| 6,188,684 B1 | 2/2001 | Setoyama et al. |
| 6,195,689 B1 | 2/2001 | Bahlmann |
| 6,201,536 B1 | 3/2001 | Hendricks et al. |
| 6,201,540 B1 | 3/2001 | Gallup et al. |
| 6,205,485 B1 | 3/2001 | Kikinis |
| 6,208,335 B1 | 3/2001 | Gordon et al. |
| 6,209,130 B1 | 3/2001 | Rector et al. |
| 6,216,264 B1 | 4/2001 | Maze et al. |
| 6,233,390 B1 | 5/2001 | Yoneda |
| 6,238,290 B1 | 5/2001 | Tarr et al. |
| 6,239,794 B1 | 5/2001 | Yuen et al. |
| 6,239,845 B1 | 5/2001 | Itagaki et al. |
| 6,240,555 B1 | 5/2001 | Shoff et al. |
| 6,243,142 B1 | 6/2001 | Mugura et al. |
| 6,249,532 B1 | 6/2001 | Yoshikawa et al. |
| 6,253,375 B1 | 6/2001 | Gordon et al. |
| 6,259,733 B1 | 7/2001 | Kaye et al. |
| 6,263,501 B1 | 7/2001 | Schein et al. |
| 6,266,814 B1 | 7/2001 | Lemmons et al. |
| 6,268,849 B1 | 7/2001 | Boyer et al. |

(56) References Cited

U.S. PATENT DOCUMENTS

| | | |
|---|---|---|
| 6,272,484 B1 | 8/2001 | Martin et al. |
| 6,275,268 B1 | 8/2001 | Knudson et al. |
| 6,275,506 B1 | 8/2001 | Fazel et al. |
| 6,282,713 B1 | 8/2001 | Kitsukawa et al. |
| 6,289,346 B1 | 9/2001 | Milewski et al. |
| 6,289,514 B1 | 9/2001 | Link et al. |
| 6,292,624 B1 | 9/2001 | Saib et al. |
| 6,305,019 B1 | 10/2001 | Dyer et al. |
| 6,305,020 B1 | 10/2001 | Hoarty et al. |
| 6,311,011 B1 | 10/2001 | Kuroda |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,317,777 B1 | 11/2001 | Skarbo et al. |
| 6,317,881 B1 | 11/2001 | Shah-Nazaroff et al. |
| 6,317,885 B1 | 11/2001 | Fries |
| 6,323,911 B1 | 11/2001 | Schein et al. |
| 6,324,694 B1 | 11/2001 | Watts et al. |
| 6,327,628 B1 | 12/2001 | Anuff et al. |
| 6,335,936 B1 | 1/2002 | Bossemeyer, Jr. et al. |
| 6,347,400 B1 | 2/2002 | Ohkura et al. |
| 6,349,410 B1 | 2/2002 | Lortz |
| 6,353,448 B1 | 3/2002 | Scarborough et al. |
| 6,357,046 B1 | 3/2002 | Thompson et al. |
| 6,359,636 B1 | 3/2002 | Schindler et al. |
| 6,360,367 B1 | 3/2002 | Yamamoto |
| 6,362,841 B1 | 3/2002 | Nykanen |
| 6,367,078 B1 | 4/2002 | Lasky |
| 6,378,130 B1 | 4/2002 | Adams |
| 6,381,332 B1 | 4/2002 | Glaab |
| 6,385,614 B1 | 5/2002 | Vellandi |
| 6,393,585 B1 | 5/2002 | Houha et al. |
| 6,396,549 B1 | 5/2002 | Weber |
| 6,397,386 B1 | 5/2002 | O'Connor et al. |
| 6,400,280 B1 | 6/2002 | Osakabe |
| 6,401,243 B1 | 6/2002 | Suzuki |
| 6,405,239 B1 | 6/2002 | Addington et al. |
| 6,408,128 B1 | 6/2002 | Abecassis |
| 6,421,067 B1 | 7/2002 | Kamen et al. |
| 6,429,899 B1 | 8/2002 | Nio et al. |
| 6,434,748 B1 | 8/2002 | Shen et al. |
| 6,441,862 B1 | 8/2002 | Yuen et al. |
| 6,442,332 B1 | 8/2002 | Knudson et al. |
| 6,442,755 B1 | 8/2002 | Lemmons et al. |
| 6,442,756 B1 | 8/2002 | Durden et al. |
| 6,446,261 B1 | 9/2002 | Rosser |
| 6,446,262 B1 | 9/2002 | Malaure et al. |
| 6,452,611 B1 | 9/2002 | Gerba et al. |
| 6,460,181 B1 | 10/2002 | Donnelly |
| 6,463,585 B1 | 10/2002 | Hendricks et al. |
| 6,476,833 B1 | 11/2002 | Moshfeghi |
| 6,480,669 B1 | 11/2002 | Tsumagari et al. |
| 6,481,010 B2 | 11/2002 | Nishikawa et al. |
| 6,481,011 B1 | 11/2002 | Lemmons |
| 6,484,318 B1 | 11/2002 | Shioda et al. |
| 6,486,920 B2 | 11/2002 | Arai et al. |
| 6,501,902 B1 | 12/2002 | Wang |
| 6,505,348 B1 | 1/2003 | Knowles et al. |
| 6,507,949 B1 | 1/2003 | Jonason et al. |
| 6,510,556 B1 | 1/2003 | Kusaba et al. |
| 6,512,552 B1 | 1/2003 | Subramanian |
| 6,515,680 B1 | 2/2003 | Hendricks et al. |
| 6,515,710 B1 | 2/2003 | Koshimuta |
| 6,518,986 B1 | 2/2003 | Mugura |
| 6,519,770 B2 | 2/2003 | Ford |
| 6,526,575 B1 | 2/2003 | McCoy et al. |
| 6,526,577 B1 | 2/2003 | Knudson et al. |
| 6,530,083 B1 | 3/2003 | Liebenow |
| 6,532,589 B1 | 3/2003 | Proehl et al. |
| 6,532,593 B1 | 3/2003 | Moroney |
| 6,536,041 B1 | 3/2003 | Knudson et al. |
| 6,539,548 B1 | 3/2003 | Hendricks et al. |
| 6,543,053 B1 | 4/2003 | Li et al. |
| 6,545,669 B1 | 4/2003 | Kinawi et al. |
| 6,557,030 B1 | 4/2003 | Hoang |
| 6,563,515 B1 | 5/2003 | Reynolds et al. |
| 6,564,005 B1 | 5/2003 | Berstis |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,571,390 B1 | 5/2003 | Dunn et al. |
| 6,574,793 B1 | 6/2003 | Ngo et al. |
| 6,578,077 B1 | 6/2003 | Rakoshitz et al. |
| 6,578,201 B1 | 6/2003 | LaRocca et al. |
| 6,594,699 B1 | 7/2003 | Sahai et al. |
| 6,594,825 B1 | 7/2003 | Goldschmidt Iki et al. |
| 6,594,826 B1 | 7/2003 | Rao et al. |
| 6,600,496 B1 | 7/2003 | Wagner et al. |
| 6,601,103 B1 | 7/2003 | Goldschmidt Iki et al. |
| 6,604,240 B2 | 8/2003 | Ellis et al. |
| 6,609,253 B1 | 8/2003 | Swix et al. |
| 6,611,958 B1 | 8/2003 | Shintani et al. |
| 6,614,440 B1 | 9/2003 | Bowen et al. |
| 6,614,988 B1 | 9/2003 | Sampsell |
| 6,628,302 B2 | 9/2003 | White et al. |
| 6,631,413 B1 | 10/2003 | Aggarwal et al. |
| 6,642,939 B1 | 11/2003 | Vallone et al. |
| 6,647,548 B1 | 11/2003 | Lu et al. |
| 6,651,044 B1 | 11/2003 | Stoneman |
| 6,662,365 B1 | 12/2003 | Sullivan et al. |
| 6,664,984 B2 | 12/2003 | Schlarb et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,675,388 B1 | 1/2004 | Beckmann et al. |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan |
| 6,718,552 B1 | 4/2004 | Goode |
| 6,721,953 B1 | 4/2004 | Bates et al. |
| 6,725,461 B1 | 4/2004 | Dougherty et al. |
| 6,731,310 B2 | 5/2004 | Craycroft et al. |
| 6,732,366 B1 | 5/2004 | Russo |
| 6,732,367 B1 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,978 B1 | 5/2004 | Hendricks et al. |
| 6,738,982 B1 | 5/2004 | Jerding |
| 6,754,904 B1 | 6/2004 | Cooper et al. |
| 6,754,906 B1 | 6/2004 | Finseth et al. |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,934,964 B1 | 8/2005 | Schaffer et al. |
| 6,938,258 B1 | 8/2005 | Weinberger et al. |
| 6,957,386 B2 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |

(56) References Cited

U.S. PATENT DOCUMENTS

| | | |
|---|---|---|
| 6,987,728 B2 | 1/2006 | Deshpande |
| 6,990,676 B1 | 1/2006 | Proehl et al. |
| 6,990,677 B1 | 1/2006 | Pietraszak et al. |
| 6,993,782 B1 | 1/2006 | Newberry et al. |
| 7,010,492 B1 | 3/2006 | Bassett et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,065,709 B2 | 6/2006 | Ellis et al. |
| 7,069,575 B1 | 6/2006 | Goode et al. |
| 7,076,734 B2 | 7/2006 | Wolff et al. |
| 7,086,077 B2 | 8/2006 | Giammaressi |
| 7,103,903 B1 | 9/2006 | Kydd |
| 7,103,905 B2 | 9/2006 | Novak |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,143,432 B1 | 11/2006 | Brooks et al. |
| 7,150,031 B1 | 12/2006 | Rodriguez et al. |
| 7,155,733 B2 | 12/2006 | Rodriguez et al. |
| 7,168,086 B1 | 1/2007 | Carpenter et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,246,367 B2 | 7/2007 | Livonen |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,535,888 B1 | 5/2009 | Carlucci et al. |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,925,534 B2 | 4/2011 | Amano et al. |
| 7,934,232 B1 | 4/2011 | Jerding et al. |
| 7,961,643 B2 | 6/2011 | McDonald et al. |
| 7,962,370 B2 | 6/2011 | Rodriguez et al. |
| 7,975,277 B1 | 7/2011 | Jerding et al. |
| 7,992,163 B1 | 8/2011 | Jerding et al. |
| 7,992,166 B2 | 8/2011 | Jerding et al. |
| 8,005,713 B1 | 8/2011 | Sanz-Pastor et al. |
| 8,006,262 B2 | 8/2011 | Rodriguez et al. |
| 8,006,273 B2 | 8/2011 | Rodriguez et al. |
| 8,020,184 B2 | 9/2011 | Jerding et al. |
| 8,032,914 B2 | 10/2011 | Rodriguez et al. |
| 8,037,504 B2 | 10/2011 | Jerding et al. |
| 8,056,106 B2 | 11/2011 | Rodriguez et al. |
| 8,069,259 B2 | 11/2011 | Rodriguez et al. |
| 8,079,047 B1 | 12/2011 | Jerding et al. |
| 8,161,388 B2 | 4/2012 | Rodriguez et al. |
| 8,189,472 B2 | 5/2012 | McDonald et al. |
| 8,191,093 B2 | 5/2012 | Rodriguez et al. |
| 8,255,951 B2 | 8/2012 | Jerding et al. |
| 8,516,525 B1 | 8/2013 | Jerding et al. |
| 8,620,135 B2 | 12/2013 | Rodriguez et al. |
| 8,640,172 B2 | 1/2014 | Rodriguez et al. |
| 8,707,153 B2 | 4/2014 | Rodriguez et al. |
| 8,745,656 B2 | 6/2014 | Rodriguez et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032293 A1 | 10/2001 | Korst et al. |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2001/0047517 A1 | 11/2001 | Christopoulos et al. |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0042920 A1 | 4/2002 | Thomas et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0124255 A1 | 9/2002 | Reichardt et al. |
| 2002/0128908 A1 | 9/2002 | Levin et al. |
| 2002/0129362 A1 | 9/2002 | Chang et al. |
| 2002/0186957 A1 | 12/2002 | Yuen |
| 2003/0002862 A1 | 1/2003 | Rodriguez et al. |
| 2003/0014753 A1 | 1/2003 | Beach et al. |
| 2003/0023971 A1 | 1/2003 | Martinolich et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0040962 A1 | 2/2003 | Lewis |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079224 A1 | 4/2003 | Komar et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1* | 10/2003 | Estrop .................. G09G 5/006 345/204 |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163114 A1 | 8/2004 | Rodriguez et al. |

(56) References Cited

U.S. PATENT DOCUMENTS

| | | |
|---|---|---|
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261098 A1 | 12/2004 | Macrae et al. |
| 2004/0261112 A1 | 12/2004 | Hicks et al. |
| 2004/0261125 A1 | 12/2004 | Ellis et al. |
| 2005/0005308 A1 | 1/2005 | Logan et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0235319 A1 | 10/2005 | Carpenter et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0046947 A1 | 2/2008 | Katznelson |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0216111 A1 | 9/2008 | Alten et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150946 A1 | 6/2009 | Rodriguez et al. |
| 2009/0150957 A1 | 6/2009 | Jerding et al. |
| 2009/0150958 A1 | 6/2009 | Jerding et al. |
| 2009/0150959 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0199249 A1 | 8/2009 | Rodriguez et al. |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |
| 2011/0279863 A1 | 11/2011 | Chang et al. |
| 2014/0282701 A1 | 9/2014 | Rodriguez et al. |
| 2014/0282732 A1 | 9/2014 | Jerding et al. |

FOREIGN PATENT DOCUMENTS

| | | |
|---|---|---|
| CA | 2 475 723 C | 1/2011 |
| CA | 2408289 | 8/2012 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 052 644 A | 11/2000 |
| EP | 1 069 801 A1 | 1/2001 |
| EP | 1 075 143 A1 | 2/2001 |
| EP | 1 113 668 A1 | 4/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 2000-101941 | 4/2000 |
| JP | 2001/67786 | 3/2001 |
| WO | WO 92/22983 | 12/1992 |
| WO | WO 94/14284 | 6/1994 |
| WO | WO 95/28799 | 10/1995 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | 96/41470 | 12/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |

(56) References Cited

FOREIGN PATENT DOCUMENTS

| | | |
|---|---|---|
| WO | WO 99/60790 | 11/1999 |
| WO | 99/65237 | 12/1999 |
| WO | WO 99/66719 | 12/1999 |
| WO | WO 00/01149 | 1/2000 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | 00/58967 A1 | 10/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

U.S. Appl. No. 11/460,516, filed Jul. 27, 2006 entitled "Video Promotional and Advertising Systems for Video on Demand System".
U.S. Appl. No. 12/372,887, filed Feb. 18, 2009 entitled "Selection of Purchasable Enhancements of a Television Service".
U.S. Appl. No. 12/372,952, filed Feb. 18, 2009 entitled "System and Method for Assessing Usage of Purchasable Enhancements of Television Services".
U.S. Appl. No. 12/388,002, filed Feb. 18, 2009 entitled "System and Method for Providing Purchasable Enhancements of VOD Services".
U.S. Appl. No. 12/372,776, filed Feb. 18, 2009 entitled "Configurable Options for Accessible On-Demand Information".
U.S. Appl. No. 12/388,139, filed Feb. 18, 2009 entitled "Upgrading Access of Television Program Information with Optional Features".
U.S. Appl. No. 12/372,803, filed Feb. 18, 2009 entitled "Management of Generic Service Enhancements for Television Services".
U.S. Appl. No. 10/780,448, filed Feb. 13, 2004 entitled "System and Method for Expiration Reminders of Rentable Media Offerings".
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/494,209, filed Jan. 1, 2000 entitled "System and Method for Allowing a User to Quickly Navigate Within a Program Guide to an Established Point".
U.S. Appl. No. 09/502,067, filed Feb. 10, 2000 entitled "Method and System for Identification of Pay-per-View Programming".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931, filed May 4, 2000 entitled "Navigation Paradigm for Access to Television Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/590,520, filed Jun. 9, 2000 entitled "Video on Deman System with Parameter-Controlled Bandwidth Deallocation".
U.S. Appl. No. 09/590,518, filed Jun. 9, 2000 entitled "Catalog Management System for Video on Demand System".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
U.S. Appl. No. 09/693,784, filed Oct. 20, 2000 entitled "System and Method for Reminders of Upcoming Rentable Media Offerings".
U.S. Appl. No. 09/693,780, filed Oct. 20, 2000 entitled "Sychronized Video-On-Demand Supplemental Commentary".
U.S. Appl. No. 09/896,390, filed Jun. 29, 2001 entitled "System and Method for Archiving Multiple Downloaded Recordable Media Content".
U.S. Appl. No. 09/896,331, filed Jun. 29, 2001 entitled "Method and Apparatus for Recordable Media Content Distribution".
U.S. Appl. No. 14/166,460, filed Jan. 28, 2014 entitled "System and Method for Characterization of Purchasable and Recordable Media (PRM)".
U.S. Appl. No. 10/008,429, filed Nov. 13, 2001 entitled "Graphic User Interface Alternate Download Options for Unavailable PRM Content".
U.S. Appl. No. 10/957,849, filed Oct. 4, 2004, entitled "User Input for Access to Television Services".
U.S. Appl. No. 10/957,854, filed Oct. 4, 2004, entitled "Menu Operation for Access to Television Services".
U.S. Appl. No. 10/957,942, filed Oct. 4, 2004, entitled "Control Access to Television Services".
U.S. Appl. No. 12/389,128, filed Feb. 19, 2009, entitled "Configuration of TV Services via Alternate Communication".
U.S. Appl. No. 14/287,339, filed May 27, 2014 entitled "Hypertext Service Guide Menu Display".
Almeroth et al.; An Alternative Paradigm for Scalable On-Demand Applications: Evaluating and Deploying the Interactive multimedia Jukebox; 1999; I EEE; vol. 11; p. 658-672.
Law Office Computing, AportisDoc Mobile Edition 2.2, retrieved on Aug. 14, 2008 at http://www.lawofficecomputing.com/old_site/Reviewsdata/djO 1/aportisdoc.asp, 2 pgs.
Perlman et al.; A working Anti-Taping System for Cable Pay-Per-View; Aug. 1998; IEEE; vol. 35; 6 pgs.
Wikipedia, Moxi, retrieved on Aug. 14, 2008 at http://en.wikipedia.orglwiki/Moxi, 8 pgs.
BPAI Decision for U.S. Appl. No. 09/896,231, mailed Nov. 6, 2007, 17 pgs.

(56) References Cited

OTHER PUBLICATIONS

U.S. Office Action in U.S. Appl. No. 09/590,521 mailed Apr. 9, 2001, 15 pgs.
U.S. Office Action in U.S. Appl. No. 09/590,521 mailed Oct. 24, 2001, 19 pgs.
U.S. Office Action in U.S. Appl. No. 09/590,521 mailed May 23, 2002, 19 pgs.
U.S. Office Action in U.S. Appl. No. 09/590,521 mailed Aug. 28, 2002, 11 pgs.
U.S. Office Action in U.S. Appl. No. 09/590,521 mailed Feb. 26, 2003, 17 pgs.
U.S. Office Action in U.S. Appl. No. 10/073,842 mailed Jun. 25, 2003, 16 pgs.
U.S. Office Action in U.S. Appl. No. 09/590,521 mailed Aug. 6, 2003, 19 pgs.
U.S. Office Action in U.S. Appl. No. 09/590,518 mailed Sep. 9, 2003, 10 pgs.
U.S. Office Action in U.S. Appl. No. 09/693,780 mailed Sep. 13, 2003, 16 pgs.
U.S. Office Action in U.S. Appl. No. 09/693,784 mailed Sep. 25, 2003, 9 pgs.
U.S. Office Action in U.S. Appl. No. 10/073,842 mailed Dec. 24, 2003, 9 pgs.
U.S. Office Action in U.S. Appl. No. 09/693,780 mailed Jan. 9, 2004, 10 pgs.
U.S. Office Action in U.S. Appl. No. 09/590,521 mailed Jan. 21, 2004, 12 pgs.
U.S. Office Action in U.S. Appl. No. 09/590,518 mailed Mar. 11, 2004, 11 pgs.
U.S. Office Action in U.S. Appl. No. 09/693,780 mailed May 6, 2004, 16 pgs.
U.S. Office Action in U.S. Appl. No. 09/709,145 mailed Jul. 20, 2004, 14 pgs.
U.S. Office Action in U.S. Appl. No. 10/073,842 mailed Aug. 2, 2004, 10 pgs.
U.S. Office Action in U.S. Appl. No. 09/590,518 mailed Sep. 23, 2004, 14 pgs.
U.S. Office Action in U.S. Appl. No. 09/693,784 mailed Dec. 1, 2004, 8 pgs.
U.S. Office Action in U.S. Appl. No. 10/780,448 mailed Dec. 29, 2004, 9 pgs.
U.S. Office Action in U.S. Appl. No. 09/590,520 mailed Mar. 11, 2005, 11 pgs.
U.S. Office Action in U.S. Appl. No. 09/590,518 mailed Mar. 14, 2005, 15 pgs.
U.S. Office Action in U.S. Appl. No. 09/693,780 mailed Apr. 20, 2005, 20 pgs.
U.S. Office Action in U.S. Appl. No. 09/709,145 mailed Apr. 22, 2005, 21 pgs.
U.S. Office Action in U.S. Appl. No. 10/780,448 mailed May 3, 2005, 7 pgs.
U.S. Office Action in U.S. Appl. No. 10/073,842 mailed Jun. 1, 2005, 10 pgs.
U.S. Office Action in U.S. Appl. No. 09/896,390 mailed Jun. 15, 2005, 7 pgs.
U.S. Office Action in U.S. Appl. No. 09/693,784 mailed Aug. 12, 2005, 15 pgs.
U.S. Office Action in U.S. Appl. No. 09/896,470 mailed Aug. 25, 2005, 21 pgs.
U.S. Office Action in U.S. Appl. No. 10/780,448 mailed Oct. 13, 2005, 9 pgs.
U.S. Office Action in U.S. Appl. No. 09/896,390 mailed Oct. 19, 2005, 15 pgs.
U.S. Office Action in U.S. Appl. No. 09/709,145 mailed Nov. 2, 2005, 26 pgs.
U.S. Office Action in U.S. Appl. No. 09/693,780 mailed Dec. 19, 2005, 17 pgs.
U.S. Office Action in U.S. Appl. No. 09/896,470 mailed Feb. 1, 2006, 15 pgs.
U.S. Office Action in U.S. Appl. No. 09/896,390 mailed Feb. 8, 2006, 14 pgs.
U.S. Office Action in U.S. Appl. No. 10/008,429 mailed Apr. 4, 2006, 18 pgs.
U.S. Office Action in U.S. Appl. No. 09/693,780 mailed Apr. 5, 2006, 25 pgs.
U.S. Office Action in U.S. Appl. No. 10/073,842 mailed May 2, 2006, 9 pgs.
U.S. Office Action in U.S. Appl. No. 09/693,780 mailed Jul. 7, 2006, 18 pgs.
U.S. Office Action in U.S. Appl. No. 09/709,145 mailed Jul. 28, 2006, 25 pgs.
U.S. Office Action in U.S. Appl. No. 09/590,518 mailed Aug. 14, 2006, 10 pgs.
U.S. Office Action in U.S. Appl. No. 10/073,842 mailed Sep. 5, 2006, 10 pgs.
U.S. Office Action in U.S. Appl. No. 09/896,470 mailed Sep. 6, 2006, 11 pgs.
U.S. Office Action in U.S. Appl. No. 09/896,390 mailed Oct. 23, 2006, 20 pgs.
U.S. Office Action in U.S. Appl. No. 10/008,429 mailed Oct. 31, 2006, 25 pgs.
U.S. Office Action in U.S. Appl. No. 09/709,145 mailed Jan. 12, 2007, 27 pgs.
U.S. Office Action in U.S. Appl. No. 09/896,470 mailed Feb. 27, 2007, 14 pgs.
U.S. Office Action in U.S. Appl. No. 10/073,842 mailed Mar. 9, 2007, 10 pgs.
U.S. Office Action in U.S. Appl. No. 10/008,429 mailed May 3, 2007, 22 pgs.
U.S. Office Action in U.S. Appl. No. 09/896,390 mailed May 21, 2007, 16 pgs.
U.S. Office Action in U.S. Appl. No. 09/590,518 mailed Jun. 26, 2007, 11 pgs.
U.S. Office Action in U.S. Appl. No. 10/683,138 mailed Jul. 5, 2007, 10 pgs.
U.S. Office Action in U.S. Appl. No. 09/896,470 mailed Jul. 30, 2007, 17 pgs.
U.S. Office Action in U.S. Appl. No. 09/896,390 mailed Nov. 5, 2007, 14 pgs.
U.S. Office Action in U.S. Appl. No. 10/008,429 mailed Dec. 5, 2007, 23 pgs.
U.S. Office Action in U.S. Appl. No. 09/590,518 mailed Dec. 14, 2007, 11 pgs.
U.S. Office Action in U.S. Appl. No. 10/683,138 mailed Dec. 28, 2007, 10 pgs.
U.S. Office Action in U.S. Appl. No. 09/896,390 mailed Apr. 9, 2008, 17 pgs.
U.S. Office Action in U.S. Appl. No. 09/896,470 mailed Apr. 18, 2008, 14 pgs.
U.S. Office Action in U.S. Appl. No. 09/590,518 mailed Jul. 23, 2008, 11 pgs.
U.S. Office Action in U.S. Appl. No. 10/683,138 mailed Aug. 7, 2008, 10 pgs.
U.S. Office Action in U.S. Appl. No. 10/683,138 mailed Jan. 21, 2009 10 pgs.
U.S. Office Action in U.S. Appl. No. 09/590,518 mailed Jan. 23, 2009, 11 pgs.
U.S. Office Action in U.S. Appl. No. 10/683,138 mailed Jul. 6, 2009, 11 pgs.
U.S. Non-Final Office Action in U.S. Appl. No. 12/372,894 mailed Oct. 27, 2009, 6 pages.
U.S. Office Action in U.S. Appl. No. 12/372,898 mailed Oct. 27, 2009, 8 pgs.
U.S. Office Action in U.S. Appl. No. 12/372,905 mailed Oct. 27, 2009, 6 pgs.
U.S. Office Action in U.S. Appl. No. 10/683,138 mailed Jan. 27, 2010, 11 pgs.
U.S. Office Action mailed Jun. 27, 2014 in U.S. Appl. No. 13/482,689, 25 pgs.
U.S. Office Action mailed Feb. 25, 2015 in U.S. Appl. No. 13/482,497, 20 pages.

(56) References Cited

OTHER PUBLICATIONS

U.S. Office Action mailed May 15, 2015 in U.S. Appl. No. 14/287,339, 16 pages.
Canadian Office Action dated Jul. 11, 2011 in Application No. 2,554,208, 4 pages.
European Office Action dated Oct. 10, 2011 in Application No. 02744705.1, 9 pages.
Canadian Office Action dated Oct. 17, 2011 in Application No. 2,402,088, 4 pages.
Summons to attend oral proceedings mailed Dec. 29, 2011 in Application No. 00939759.7, 9 pages.
Summons to attend oral proceedings mailed Jul. 31, 2012 in Application No. 02744705.1, 5 pages.
European Communication dated Nov. 14, 2012 in Application No. 09154377.7, 6 pages.
Canadian Office Action mailed Apr. 11, 2013 in Application No. 2,402,088, 7 pages.
Canadian Office Action mailed Oct. 17, 2013 in Application No. 2,451,477, 3 pages.
U.S. Final Office Action mailed Jul. 19, 2011 in U.S. Appl. No. 11/162,345, all pages.
Board of Patent Appeals and Interferences Decision mailed Aug. 8, 2011 in U.S. Appl. No. 09/518,041, 9 pgs.
U.S. Non-Final Office Action mailed Sep. 6, 2011 in U.S. Appl. No. 11/238,369, 22 pgs.
U.S Non-Final Office Action mailed Sep. 13, 2011 in U.S. Appl. No. 12/389,564, 16 pgs.
U.S. Non-Final Office Action mailed Sep. 27, 2011 in U.S. Appl. No. 12/413,686, 24 pgs.
U.S. Final Office Action mailed Nov. 10, 2011 in U.S. Appl. No. 10/934,253, 14 pgs.
U.S. Final Office Action mailed Jan. 24, 2012 in U.S. Appl. No. 11/238,369, 19 pgs.
U.S. Final Office Action mailed Apr. 16, 2012 in U.S. Appl. No. 12/413,686, 21 pgs.
U.S. Final Office Action mailed May 14, 2012 in U.S. Appl. No. 11/238,369, 16 pgs.
U.S. Non-Final Office Action mailed May 30, 2012 in U.S. Appl. No. 10/740,138, 27 pgs.
U.S. Non-Final Office Action mailed Dec. 26, 2012 in U.S. Appl. No. 12/413,686, 9 pages.
U.S. Final Office Action mailed Apr. 19, 2013 in U.S. Appl. No. 10/740,138, 31 pages.
U.S. Non-Final Office Action mailed Jun. 5, 2013 in U.S. Appl. No. 11/678,653, 50 pages.
U.S. Non-Final Office Action mailed Jun. 19, 2013 in U.S. Appl. No. 10/934,253, 14 pages.
U.S. Final Office Action mailed Jun. 25, 2013 in U.S. Appl. No. 12/413,686, 10 pages.
U.S. Office Action mailed Feb. 26, 2014 in U.S. Appl. No. 13/482,689, 26 pages.
U.S. Office Action mailed Apr. 16, 2014 in U.S. Appl. No. 13/482,497, 16 pages.
Rousseau, "Synchronized Multimedia for the WWW.," retrieved from http://www7.wwwconference.org/1833/com1833.htm on Nov. 21, 2013, 15 pages.
U.S. Office Action mailed Sep. 22, 2014 in U.S. Appl. No. 13/482,689, 74 pgs.
U.S. Office Action mailed Jan. 27, 2015 in U.S. Appl. No. 14/287,339, 105 pages.
EP Communication in Appln No. 02 794 161.6 mailed Apr. 2, 2009, 4 pgs.
EP Communication in Appln No. 02 794 161.6 mailed Oct. 22, 2009, 3 pgs.
PCT Search Report in International Application No. PCT/US02/37282 mailed Feb. 7, 2003, 4 pgs.
PCT International Search Report in Appln No. PCT/US02/14874 mailed Nov. 20, 2002, 4 pgs.
PCT Written Opinion in Appln No. PCT/US02/14874 mailed Feb. 11, 2003, 5 pgs.
EP Communication in Appln No. 02 736 739.0 mailed Oct. 13, 2009, 3 pgs.
EP Communication in Appln No. 02 736 739.0 mailed Jan. 17, 2012, 4 pgs.
Canadian Office Action mailed Oct. 2, 2012 in Appln No. 2,658,766, 2 pgs.
EP Communication mailed May 26, 2014 in Appln No. 02 782 347.5, 6 pgs.
EP Communication mailed Jun. 3, 2014 in Appln No. 03 745 157.2, 6 pgs.
U.S. Office Action mailed Nov. 10, 2014 in U.S. Appl. No. 13/482,497, 73 pages.
U.S. Office Action mailed Nov. 20, 2014 in U.S. Appl. No. 14/294,624, 99 pages.
"A Brief History of the Trailer," http://www.movietrailertrash.com/views/history.html, 11 pages(Publicly known at least as early as Dec. 20, 2003).
"Client User Interface Specification (Phase I) for Video-On-Demand Application Development on the Explorer 2000™ Digital Home Communications Terminal", Revision 1.10 (Aug. 31, 1998), 20 pages.
"Evidence of illustrative movie release years," Retrieved from the Internet Movie Database using Internet, http://www.imdb.com, 19 pages (Retrieved on Jun. 6, 2005).
"ISO/IEC 13818-6 Information technology—Generic coding of moving pictures and associated audio information—Part 6: Extensions for DSM-CC," Chapter 4, 113 pages (Sep. 1, 1998).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997) "Sez You . . . origin of word daemon," *Take Our Word for It*, Issue 146, p. 4, http://www.takeourword.com/TOW146/page4.html (retrieved on Apr. 4, 2006).
Addington, Timothy H., "System Architecture Specification for Video-On-Demand Application Development on the Explorer 2000™ Digital Home Communications Terminal", Revision 1.10r Review (Mar. 4, 1999), 53 pages.
Alberico, G. et al., "Satellite Interactive Multimedia: A New Opportunity for Broadcasters," *International Broadcasting Convention*, Conference Publication No. 447, pp. 18-23 (Sep. 12-16, 1997).
ATI Multimedia Center 7.9, User's Guide, ATI Technologies Inc., pp. i-vi and 1-96 (Copyright 2002).
Barth et al., "10 Fernsehen am PC", Suse GMBH, XP-002324319, pp. 143-149 (2001).
BPAI Decision for U.S. Appl. No. 09/692,995, mailed Aug. 20, 2008, 10 pages.
BPAI Decision for U.S. Appl. No. 09/693,288, mailed Nov. 28, 2007, 5 pages.
Canadian Office Action in Application No. 2,376,556 mailed Sep. 30, 2008, all pages.
Canadian Office Action in Application No. 2,376,556 mailed Nov. 23, 2007, all pages.
Canadian Office Action in Application No. 2,376,556 mailed Dec. 6, 2005, all pages.
Canadian Office Action in Application No. 2,402,088 mailed Jun. 1, 2010, all pages.
Canadian Office Action in Application No. 2,402,088 mailed May 30, 2006, all pages.
Canadian Office Action in Application No. 2,405,491 mailed Jun. 9, 2010, all pages.
Canadian Office Action in Application No. 2,405,491 mailed Apr. 3, 2009, all pages.
Canadian Office Action in Application No. 2,405,491 mailed May 22, 2008, all pages.
Canadian Office Action in Application No. 2,405,491 mailed Jun. 20, 2007, all pages.
Canadian Office Action in Application No. 2,405,491 mailed Jan. 20, 2006, all pages.

(56) References Cited

OTHER PUBLICATIONS

Canadian Office Action in Application No. 2,408,289 mailed Sep. 2, 2010, 3 pages.
Canadian Office Action in Application No. 2,408,289 mailed Aug. 27, 2008, all pages.
Canadian Office Action in Application No. 2,408,289 mailed May 30, 2006, all pages.
Canadian Office Action in Application No. 2,451,477 mailed Nov. 3, 2009, all pages.
Canadian Office Action in Application No. 2,456,318 mailed Nov. 17, 2010, 4 pages.
Canadian Office Action in Application No. 2,456,318 mailed May 5, 2008, all pages.
Canadian Office Action in Application No. 2,456,318 mailed Mar. 27, 2007, all pages.
Canadian Office Action in Application No. 2,459,334 mailed Mar. 4, 2011, 3 pages.
Canadian Office Action in Application No. 2,459,334 mailed Apr. 16, 2009, all pages.
Canadian Office Action in Application No. 2,466,667 mailed Apr. 15, 2009, all pages.
Canadian Office Action in Application No. 2,475,723 mailed Jul. 7, 2009, all pages.
Canadian Office Action in Application No. 2,554,208 mailed Apr. 1, 2010, all pages.
Canadian Office Action in Application No. 2,621,605 mailed Dec. 15, 2009, all pages.
Canadian Office Action in Application No. 2,451,477 mailed Oct. 20, 2010, 4 pages.
Cunningham et al., "5 Das X Window System"., Suse GMBH, XP-002324320, pp. 129-180 (2001).
Decision on Appeal affirmed in U.S. Appl. No. 09/590,434 mailed May 28, 2008, all pages.
Definition of "flag", *Microsoft Press: Computer User's Dictionary*, 3 pages (1998).
Definition of "renting", Webster's II: New College Dictionary, 1995, Houghton Mifflin Company, p. 39.
European Examination Report in Application No. 00 938 251.6 mailed Mar. 2, 2010, all pages.
European Examination Report in Application No. 00 938 251.6 mailed Nov. 2, 2007, all pages.
European Examination Report in Application No. 00 939 759.7 mailed May 10, 2007, all pages.
European Examination Report in Application No. 01 905 058.2 mailed Dec. 19, 2006, all pages.
European Examination Report in Application No. 01 922 261.1 mailed Jul. 18, 2008, all pages.
European Examination Report in Application No. 01 922 261.1 mailed Nov. 2, 2007, all pages.
European Examination Report in Application No. 01 922 261.1 mailed Jan. 24, 2007, all pages.
European Examination Report in Application No. 01 922 261.1 mailed May 26, 2006, all pages.
European Examination cited in Application No. 01 923 092.9 mailed Jul. 20, 2009, all pages.
European Examination Report in Application No. 01 923 092.9 mailed Nov. 27, 2008, all pages.
European Examination Report in Application No. 01 937 209.3 mailed Mar. 16, 2010, all pages.
European Examination Report in Application No. 01 937 209.3 mailed Jun. 23, 2008, all pages.
European Examination Report in Application No. 02 737 593.0 mailed May 6, 2009, all pages.
European Examination Report in Application No. 02 750 416.6 mailed Aug. 4, 2008, all pages.
European Examination Report in Application No. 02 750 416.6 mailed Aug. 28, 2007, all pages.
European Examination Report in Application No. 02 761 572.3 mailed Apr. 20, 2009, all pages.
European Examination Report in Application No. 02 761 572.3 mailed Sep. 22, 2008, all pages.
European Examination Report in Application No. 02 761 572.3 mailed Jan. 22, 2008, all pages.
European Examination Report in Application No. 02 761 572.3 mailed Aug. 29, 2007, all pages.
European Examination Report in Application No. 06 802 683.0 mailed Jun. 26, 2008, all pages.
Examiner's Answer to Appeal Brief in U.S. Appl. No. 09/590,488 mailed Jan. 11, 2008, all pages.
"Industry Leading Software Vendors Endorse BroadVision's Next Generation of Retail and Business-To-Business E-Commerce Application Solutions," PR Newswire, Jun. 14, 1999, 4 pages.
Japanese Office Action in Application No. 2001-581527 mailed Feb. 10, 2010, all pages.
Japanese Office Action in Application No. 2001-581527 mailed Sep. 8, 2009, all pages.
Kevin, "Change Screen Resolution in Windows (Tips, Tricks, Tweaks, and Setting)," http://www.tacktech.com/display.cfm?t-tid=207, pp. 1-3 (Oct. 26, 2002).
Leftwitch et al., "StarSight Interactive Television Program Guide—Functional/International Architecture Specification Document, Interaction Analysis and Design Project—Phase III," published no later than Dec. 15, 1995, 36 pages.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
PCT Search Report in International Application No. PCT/US00/15952 mailed Jan. 16, 2001, all pages.
PCT Search Report in International Application No. PCT/US00/15963 mailed Sep. 1, 2000, all pages.
PCT Search Report in International Application No. PCT/US00/16000 mailed Oct. 2, 2000, all pages.
PCT Search Report in International Application No. PCT/US01/02490 mailed May 18, 2001, all pages.
PCT Search Report in International Application No. PCT/US01/06663 mailed Oct. 18, 2001, all pages.
PCT Search Report in International Application No. PCT/US01/10874 mailed Nov. 29, 2001, all pages.
PCT Search Report in International Application No. PCT/US01/14150 mailed Apr. 29, 2002, all pages.
PCT Search Report in International Application No. PCT/US02/20307 mailed Jan. 3, 2003, all pages.
PCT Search Report in International Application No. PCT/US02/20519 mailed Apr. 7, 2003, all pages.
PCT Search Report in International Application No. PCT/US02/24704 mailed Mar. 5, 2003, all pages.
PCT Search Report in International Application No. PCT/US02/28212 mailed Jan. 23, 2003, all pages.
PCT Search Report in International Application No. PCT/US02/36291 mailed May 23, 2003, all pages.
PCT Search Report in International Application No. PCT/US03/03391 mailed Jul. 14, 2003, all pages.
PCT Search Report and Written Opinion in International Application No. PCT/US2005/001812 mailed May 2, 2005, all pages.
PCT Search Report and Written Opinion in International Application No. PCT/US2006/033965 mailed Feb. 9, 2007, all pages.
PCT Search Report and Written Opinion in International Application No. PCT/US2006/033965 Feb. 19, 2007, all pages.
PCT Written Opinion in International Application No. PCT/US00/15952 mailed Jul. 25, 2001, all pages.
PCT Written Opinion in International Application No. PCT/US00/15963 mailed Jun. 22, 2001, all pages.
PCT Written Opinion in International Application No. PCT/US00/16000 mailed Oct. 25, 2001, all pages.
PCT Written Opinion in International Application No. PCT/US01/02490 mailed Oct. 23, 2001, all pages.
PCT Written Opinion in International Application No. PCT/US01/06663 mailed Jan. 3, 2002, all pages.
PCT Written Opinion in International Application No. PCT/US01/10874 mailed Jun. 4, 2002, all pages.

(56) References Cited

OTHER PUBLICATIONS

PCT Written Opinion in International Application No. PCT/US01/14150 mailed Sep. 30, 2004, all pages.
PCT Written Opinion in International Application No. PCT/US02/20307 mailed Aug. 8, 2003, all pages.
PCT Written Opinion in International Application No. PCT/US02/20519 mailed Apr. 6, 2004, all pages.
PCT Written Opinion in International Application No. PCT/US02/24704 mailed Nov. 20, 2003, all pages.
PCT Written Opinion in International Application No. PCT/US02/28212 mailed Dec. 4, 2003, all pages.
Summons to attend oral proceedings in EP Application No. 01937209.3 mailed Mar. 21, 2011, 7 pages.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007, all pages.
Rottentomatoes web archived site, http://web.archive.org/web/20000301122211/http://rottentomatoes.com, Mar. 1, 2000, pp. 1-2.
VESA Plug and Display Standard, Version 1, Video Electronics Standards Association, XP-002123075, 90 pages (Jun. 11, 1997).
W3C, Putting language attributes in HTML, www.w3.org/International/O-help-lang, 2 pages (Apr. 29, 1997).
Summons to attend oral proceedings pursuant to Rule 115(1) EPC in European Application No. 02737593.0-1241 mailed May 28, 2010, all pages.
Supplementary European Search Report in European Application No. 02737593.0 mailed Mar. 3, 2009, all pages.
Supplementary European Search Report in European Application No. 02744705.1 mailed Feb. 19, 2010, all pages.
Supplementary European Search Report in European Application No. 02750416.6 mailed Jan. 2, 2007, all pages.
Supplementary European Search Report in European Application No. 02761572.3 mailed Mar. 20, 2007, all pages.
Supplementary European Search Report in European Application No. 02797096.1 mailed Oct. 14, 2005, all pages.
Supplementary European Search Report in European Application No. 03713364.2 mailed Jul. 6, 2005, all pages.
Canadian Office Action dated May 31, 2011 in Application No. 2,621,605, 2 pages.
U.S. Final Office Action cited in U.S. Appl. No. 09/518,041 mailed Jul. 7, 2008, all pages.
U.S. Non-Final Office Action in U.S. Appl. No. 09/518,041 mailed Jan. 10, 2008, all pages.
U.S. Final Office Action in U.S. Appl. No. 09/518,041 mailed Aug. 24, 2007, all pages.
U.S. Non-Final Office Action in U.S. Appl. No. 09/518,041 mailed Feb. 6, 2007, all pages.
U.S. Final Office Action in U.S. Appl. No. 09/518,041 mailed Aug. 28, 2006, all pages.
U.S. Final Office Action in U.S. Appl. No. 09/518,041 mailed Sep. 15, 2005, all pages.
U.S. Non-Final Office Action in U.S. Appl. No. 09/518,041 mailed Apr. 22, 2005, all pages.
U.S. Final Office in U.S. Appl. No. 09/518,041 mailed Oct. 20, 2004, all pages.
U.S. Non-Final Office Action in U.S. Appl. No. 09/518,041 mailed Feb. 11, 2004, all pages.
U.S. Final Office Action in U.S. Appl. No. 09/518,041 mailed Aug. 27, 2003, all pages.
U.S. Non-Final Office Action in U.S. Appl. No. 09/518,041 mailed Mar. 18, 2003, all pages.
U.S. Final Office Action in U.S. Appl. No. 09/542,484 mailed Jun. 17, 2008, all pages.
U.S. Non-Final Office Action in U.S. Appl. No. 09/542,484 mailed Dec. 7, 2007, all pages.
U.S. Non-Final Office Action in U.S. Appl. No. 09/542,484 mailed Mar. 12, 2007, all pages.
U.S. Non-Final Office Action in U.S. Appl. No. 09/542,484 mailed Sep. 7, 2006, all pages.
U.S. Final Office Action in U.S. Appl. No. 09/542,484 mailed Mar. 21, 2006, all pages.
U.S. Non-Final Office Action in U.S. Appl. No. 09/542,484 mailed Jul. 28, 2005, all pages.
U.S. Final Office Action in U.S. Appl. No. 09/542,484 mailed Mar. 22, 2005, all pages.
U.S. Non-Final Office Action in U.S. Appl. No. 09/542,484 mailed Apr. 1, 2004, all pages.
U.S. Non-Final Office Action in U.S. Appl. No. 09/565,931 mailed Oct. 28, 2009, all pages.
U.S. Final Office Action in U.S. Appl. No. 09/565,931 mailed Jul. 14, 2009, all pages.
U.S. Non-Final Office Action in U.S. Appl. No. 09/565,931 mailed Feb. 13, 2009, all pages.
U.S. Final Office Action in U.S. Appl. No. 09/565,931 mailed Jun. 15, 2006, all pages.
U.S. Non-Final Office Action in U.S. Appl. No. 09/565,931 mailed Jan. 11, 2006, all pages.
U.S. Final Office Action in U.S. Appl. No. 09/565,931 mailed Jul. 1, 2005, all pages.
U.S. Non-Final Office Action in U.S. Appl. No. 09/565,931 mailed Sep. 10, 2004, all pages.
U.S. Final Office Action in U.S. Appl. No. 09/590,434 mailed May 11, 2006, all pages.
U.S. Non-Final Office Action in U.S. Appl. No. 09/590,434 mailed Nov. 21, 2005, all pages.
U.S. Final Office Action in U.S. Appl. No. 09/590,434 mailed Dec. 1, 2004, all pages.
U.S. Non-Final Office Action in U.S. Appl. No. 09/590,434 mailed Apr. 22, 2004, all pages.
U.S. Final Office Action in U.S. Appl. No. 09/590,434 mailed Dec. 18, 2003, all pages.
U.S. Non-Final Office Action in U.S. Appl. No. 09/590,434 mailed May 23, 2003, all pages.
U.S. Final Office Action in U.S. Appl. No. 09/590,488 mailed Feb. 27, 2007, all pages.
U.S. Non-Final Office Action in U.S. Appl. No. 09/590,488 mailed Oct. 26, 2006, all pages.
U.S. Final Office Action in U.S. Appl. No. 09/590,488 mailed Jul. 10, 2006, all pages.
U.S. Non-Final Office Action in U.S. Appl. No. 09/590,488 mailed Dec. 20, 2005, all pages.
U.S. Final Office Action in U.S. Appl. No. 09/590,488 mailed Jun. 30, 2005, all pages.
U.S. Non-Final Office Action in U.S. Appl. No. 09/590,488 mailed Nov. 16, 2004, all pages.
U.S. Final Office Action in U.S. Appl. No. 09/590,488 mailed Jun. 7, 2004, all pages.
U.S. Final Office Action in U.S. Appl. No. 09/590,488 mailed Dec. 16, 2003, all pages.
U.S. Non-Final Office Action in U.S. Appl. No. 09/590,488 mailed Jun. 10, 2003, all pages.
U.S. Final Office Action in U.S. Appl. No. 09/590,904 mailed Sep. 13, 2007, all pages.
U.S. Non-Final Office Action in U.S. Appl. No. 09/590,904 mailed Mar. 26, 2007, all pages.
U.S. Final Office Action in U.S. Appl. No. 09/590,904 mailed Nov. 15, 2006, all pages.
U.S. Non-Final Office Action in U.S. Appl. No. 09/590,904 mailed May 31, 2006, all pages.
U.S. Final Office Action in U.S. Appl. No. 09/590,904 mailed Jan. 24, 2006, all pages.
U.S. Non-Final Office Action in U.S. Appl. No. 09/590,904 mailed Jul. 13, 2005, all pages.

(56) References Cited

OTHER PUBLICATIONS

U.S. Final Office Action in U.S. Appl. No. 09/590,904 mailed Jan. 11, 2005, all pages.
U.S. Non-Final Office Action in U.S. Appl. No. 09/590,904 mailed Jun. 4, 2004, all pages.
U.S. Final Office Action in U.S. Appl. No. 09/591,356 mailed Apr. 13, 2006, all pages.
U.S. Non-Final Office Action in U.S. Appl. No. 09/591,356 mailed Dec. 20, 2005, all pages.
U.S. Final Office Action in U.S. Appl. No. 09/591,356 mailed Jun. 30, 2005, all pages.
U.S. Final Office Action in U.S. Appl. No. 09/591,356 mailed May 10, 2004, all pages.
U.S. Non-Final Office Action in U.S. Appl. No. 09/591,356 mailed Jan. 14, 2004, all pages.
U.S. Final Office Action in U.S. Appl. No. 09/591,356 mailed Sep. 26, 2003, all pages.
U.S. Non-Final Office Action in U.S. Appl. No. 09/591,356 mailed May 21, 2003, all pages.
U.S. Final Office Action in U.S. Appl. No. 09/692,920 mailed Jul. 22, 2008, all pages.
U.S. Non-Final Office Action in U.S. Appl. No. 09/692,920 mailed Jan. 17, 2008, all pages.
U.S. Final Office Action in U.S. Appl. No. 09/692,920 mailed Jun. 14, 2007, all pages.
U.S. Non-Final Office Action in U.S. Appl. No. 09/692,920 mailed Nov. 24, 2006, all pages.
U.S. Final Office Action in U.S. Appl. No. 09/692,920 mailed Jun. 21, 2006, all pages.
U.S. Non-Final Office Action in U.S. Appl. No. 09/692,920 mailed Feb. 16, 2006, all pages.
U.S. Final Office Action in U.S. Appl. No. 09/692,920 mailed Jun. 17, 2005, all pages.
U.S. Non-Final Office Action in U.S. Appl. No. 09/692,920 mailed Nov. 18, 2004, all pages.
U.S. Final Office Action in U.S. Appl. No. 09/692,995 mailed Sep. 4, 2009, all pages.
U.S. Non-Final Office Action in U.S. Appl. No. 09/692,995 mailed Jan. 23, 2009, all pages.
U.S. Final Office Action in U.S. Appl. No. 09/692,995 mailed Sep. 8, 2006, all pages.
U.S. Non-Final Office Action in U.S. Appl. No. 09/692,995 mailed Mar. 27, 2006, all pages.
U.S. Final Office Action in U.S. Appl. No. 09/692,995 mailed Sep. 21, 2005, all pages.
U.S. Final Office Action in U.S. Appl. No. 09/692,995 mailed May 3, 2005, all pages.
U.S. Non-Final Office Action in U.S. Appl. No. 09/692,995 mailed Oct. 21, 2004, all pages.
U.S. Final Office Action in U.S. Appl. No. 09/692,995 mailed Apr. 26, 2004, all pages.
U.S. Non-Final Office Action in U.S. Appl. No. 09/692,995 mailed Dec. 5, 2003, all pages.
U.S. Final Office Action in U.S. Appl. No. 09/693,115 mailed Jan. 25, 2005, all pages.
U.S. Non-Final Office Action in U.S. Appl. No. 09/693,115 mailed Jun. 16, 2004, all pages.
U.S. Final Office Action in U.S. Appl. No. 09/693,115 mailed Feb. 9, 2004, all pages.
U.S. Non-Final Office Action in U.S. Appl. No. 09/693,115 mailed Sep. 26, 2003, all pages.
U.S. Final Office Action in U.S. Appl. No. 09/693,288 mailed Feb. 8, 2011, 28 pages.
U.S. Non-Final Office Action in U.S. Appl. No. 09/693,288 mailed Jun. 21, 2010, all pages.
U.S. Final Office Action in U.S. Appl. No. 09/693,288 mailed Dec. 1, 2005, all pages.
U.S. Non-Final Office Action in U.S. Appl. No. 09/693,288 mailed Jul. 19, 2005, all pages.
U.S. Final Office Action in U.S. Appl. No. 09/693,288 mailed Feb. 10, 2005, all pages.
U.S. Non-Final Office Action in U.S. Appl. No. 09/693,288 mailed Jul. 15, 2004, all pages.
U.S. Final Office Action in U.S. Appl. No. 09/693,288 mailed Feb. 26, 2004, all pages.
U.S. Non-Final Office Action in U.S. Appl. No. 09/693,288 mailed Oct. 27, 2003, all pages.
U.S. Final Office Action in U.S. Appl. No. 09/693,790 mailed Jul. 25, 2008, all pages.
U.S. Non-Final Office Action in U.S. Appl. No. 09/693,790 mailed Jan. 15, 2008, all pages.
U.S. Final Office Action in U.S. Appl. No. 09/693,790 mailed Jun. 19, 2007, all pages.
U.S. Non-Final Office Action in U.S. Appl. No. 09/693,790 mailed Dec. 28, 2006, all pages.
U.S. Final Office Action in U.S. Appl. No. 09/693,790 mailed Jun. 16, 2006, all pages.
U.S. Non-Final Office Action in U.S. Appl. No. 09/693,790 mailed Dec. 28, 2005, all pages.
U.S. Final Office Action in U.S. Appl. No. 09/693,790 mailed Jun. 21, 2005, all pages.
U.S. Non-Final Office Action in U.S. Appl. No. 09/693,790 mailed Oct. 6, 2004, all pages.
U.S. Final Office Action in U.S. Appl. No. 09/881,516 mailed Jun. 3, 2005, all pages.
U.S. Non-Final Office Action in U.S. Appl. No. 09/881,516 mailed Dec. 29, 2004, all pages.
U.S. Final Office Action in U.S. Appl. No. 09/881,516 mailed Jul. 26, 2004, all pages.
U.S. Final Office Action in U.S. Appl. No. 09/881,516 mailed Apr. 21, 2004, all pages.
U.S. Non-Final Office Action in U.S. Appl. No. 09/881,516 mailed Oct. 28, 2003, all pages.
U.S. Final Office Action in U.S. Appl. No. 09/894,508 mailed Sep. 17, 2009, all pages.
U.S. Non-Final Office Action in U.S. Appl. No. 09/894,508 mailed Feb. 4, 2009, all pages.
U.S. Non-Final Office Action in U.S. Appl. No. 09/894,508 mailed Jun. 13, 2008, all pages.
U.S. Final Office Action in U.S. Appl. No. 09/894,508 mailed Dec. 31, 2007, all pages.
U.S. Non-Final Office Action in U.S. Appl. No. 09/894,508 mailed Jul. 26, 2007, all pages.
U.S. Final Office Action in U.S. Appl. No. 09/896,231 mailed May 28, 2010, all pages.
U.S. Non-Final Office Action in U.S. Appl. No. 09/896,231 mailed Nov. 17, 2009, all pages.
U.S. Final Office Action in U.S. Appl. No. 09/896,231 mailed Jun. 3, 2009, all pages.
U.S. Non-Final Office Action in U.S. Appl. No. 09/896,231 mailed Dec. 23, 2008, all pages.
U.S. Final Office Action in U.S. Appl. No. 09/896,231 mailed Dec. 29, 2005, all pages.
U.S. Non-Final Office Action in U.S. Appl. No. 09/896,231 mailed Jun. 23, 2005, all pages.
U.S. Final Office Action in U.S. Appl. No. 09/924,111 mailed Aug. 7, 2008, all pages.
U.S. Non-Final Office in U.S. Appl. No. 09/924,111 mailed Jan. 29, 2008, all pages.
U.S. Final Office Action in U.S. Appl. No. 09/924,111 mailed Oct. 5, 2007, all pages.
U.S. Non-Final Office in U.S. Appl. No. 09/924,111 mailed Apr. 19, 2007, all pages.
U.S. Final Office Action in U.S. Appl. No. 09/924,111 mailed Sep. 18, 2006, all pages.
U.S. Non-Final Office Action in U.S. Appl. No. 09/924,111 mailed Mar. 15, 2006, all pages.
U.S. Final Office Action in U.S. Appl. No. 09/947,890 mailed Nov. 24, 2009, all pages.
U.S. Non-Final Office Action in U.S. Appl. No. 09/947,890 mailed Apr. 10, 2009, all pages.

(56) References Cited

OTHER PUBLICATIONS

U.S. Final Office Action in U.S. Appl. No. 09/947,890 mailed Nov. 6, 2008, all pages.
U.S. Non-Final Office Action in U.S. Appl. No. 09/947,890 mailed Jun. 25, 2008, all pages.
U.S. Non-Final Office Action in U.S. Appl. No. 10/740,138 mailed Oct. 27, 2010, 23 pages.
U.S. Final Office Action in U.S. Appl. No. 10/740,138 mailed Jan. 15, 2010, all pages.
U.S. Non-Final Office Action in U.S. Appl. No. 10/740,138 mailed Sep. 3, 2009, all pages.
U.S. Final Office Action in U.S. Appl. No. 10/740,138 mailed Mar. 19, 2009, all pages.
U.S. Non-Final Office Action in U.S. Appl. No. 10/740,138 mailed Sep. 15, 2008, all pages.
U.S. Final Office Action in U.S. Appl. No. 10/740,138 mailed Jun. 11, 2008, all pages.
U.S. Non-Final Office Action in U.S. Appl. No. 10/740,138 mailed Oct. 2, 2007, all pages.
U.S. Final Office Action in U.S. Appl. No. 10/778,494 mailed Jul. 25, 2008, all pages.
U.S. Non-Final Office Action in U.S. Appl. No. 10/778,494 mailed Jan. 16, 2008, all pages.
U.S. Final Office Action in U.S. Appl. No. 10/778,494 mailed May 22, 2007, all pages.
U.S. Non-Final Office Action in U.S. Appl. No. 10/778,494 mailed Feb. 2, 2007, all pages.
U.S. Final Office Action in U.S. Appl. No. 10/778,494 mailed Aug. 28, 2006, all pages.
U.S. Non-Final Office Action in U.S. Appl. No. 10/778,494 mailed Dec. 29, 2004, all pages.
U.S. Final Office Action in U.S. Appl. No. 10/783,235 mailed Oct. 2, 2008, all pages.
U.S. Non-Final Office Action in U.S. Appl. No. 10/783,235 mailed Feb. 25, 2008, all pages.
U.S. Non-Final Office Action in U.S. Appl. No. 10/934,253 mailed Nov. 4, 2010, 10 pages.
U.S. Non-Final Office Action in U.S. Appl. No. 10/934,253 mailed Apr. 27, 2010, all pages.
U.S. Final Office Action in U.S. Appl. No. 10/934,253 mailed Dec. 23, 2009, all pages.
U.S. Non-Final Office Action in U.S. Appl. No. 10/934,253 mailed Jun. 26, 2009, all pages.
U.S. Final Office Action in U.S. Appl. No. 10/934,253 mailed Dec. 26, 2008, all pages.
U.S. Non-Final Office Action in U.S. Appl. No. 10/934,253 mailed Jun. 17, 2008, all pages.
U.S. Final Office Action in U.S. Appl. No. 10/934,253 mailed Jul. 24, 2007, all pages.
U.S. Non-Final Office Action in U.S. Appl. No. 10/934,253 mailed Feb. 9, 2007, all pages.
U.S. Non-Final Office Action in U.S. Appl. No. 10/934,253 mailed Sep. 14, 2006, all pages.
U.S. Final Office Action in U.S. Appl. No. 10/957,849 mailed Aug. 8, 2008, all pages.
U.S. Non-Final Office Action in U.S. Appl. No. 10/957,849 mailed Apr. 30, 2008, all pages.
U.S. Final Office Action in U.S. Appl. No. 10/957,854 mailed Apr. 1, 2010, all pages.
U.S. Non-Final Office Action in U.S. Appl. No. 10/957,854 mailed Sep. 28, 2009, all pages.
U.S. Final Office Action in U.S. Appl. No. 10/957,854 mailed Apr. 7, 2009, all pages.
U.S. Non-Final Office Action in U.S. Appl. No. 10/957,854 mailed Oct. 15, 2008, all pages.
U.S. Non-Final Office Action in U.S. Appl. No. 10/957,854 mailed Apr. 30, 2008, all pages.
U.S. Non-Final Office Action in U.S. Appl. No. 10/957,942 mailed Jun. 30, 2010, all pages.
U.S. Final Office Action in U.S. Appl. No. 10/957,942 mailed Jul. 28, 2009, all pages.
U.S. Non-Final Office Action in U.S. Appl. No. 10/957,942 mailed Jan. 14, 2009, all pages.
U.S. Final Office Action in U.S. Appl. No. 10/957,942 mailed Jul. 31, 2008, all pages.
U.S. Non-Final Office Action in U.S. Appl. No. 10/957,942 mailed May 1, 2008, all pages.
U.S. Final Office Action in U.S. Appl. No. 10/981,053 mailed Jan. 21, 2010, all pages.
U.S. Non-Final Office Action in U.S. Appl. No. 10/981,053 mailed Apr. 15, 2009, all pages.
U.S. Final Office Action in U.S. Appl. No. 10/981,053 mailed Aug. 6, 2008, all pages.
U.S. Non-Final Office Action in U.S. Appl. No. 10/981,053 mailed Jan. 2, 2008, all pages.
U.S. Final Office Action in U.S. Appl. No. 10/994,599 mailed Dec. 1, 2006, all pages.
U.S. Non-Final Office Action in U.S. Appl. No. 10/994,599 mailed May 16, 2006, all pages.
U.S. Final Office Action in U.S. Appl. No. 10/994,599 mailed Jan. 26, 2006, all pages.
U.S. Non-Final Office Action in U.S. Appl. No. 10/994,599 mailed Aug. 23, 2005, all pages.
U.S. Non-Final Office Action in U.S. Appl. No. 11/162,345 mailed Feb. 1, 2011, 33 pages.
U.S. Final Office Action in U.S. Appl. No. 11/162,345 mailed Mar. 16, 2010, all pages.
U.S. Non-Final Office Action in U.S. Appl. No. 11/162,345 mailed Aug. 21, 2009, all pages.
U.S. Final Office Action in U.S. Appl. No. 11/162,345 mailed Mar. 9, 2009, all pages.
U.S. Non-Final Office Action in U.S. Appl. No. 11/162,345 mailed Oct. 31, 2008, all pages.
U.S. Non-Final Office Action in U.S. Appl. No. 11/170,348 mailed Oct. 26, 2010, 13 pages.
U.S. Final Office Action in U.S. Appl. No. 11/170,348 mailed Feb. 1, 2010, all pages.
U.S. Non-Final Office Action in U.S. Appl. No. 11/170,348 mailed Sep. 30, 2009, all pages.
U.S. Final Office Action in U.S. Appl. No. 11/170,348 mailed May 28, 2009, all pages.
U.S. Non-Final Office Action in U.S. Appl. No. 11/170,348 mailed Dec. 11, 2008, all pages.
U.S. Final Office Action in U.S. Appl. No. 11/208,387 mailed Dec. 22, 2008, all pages.
U.S. Non-Final Office Action in U.S. Appl. No. 11/208,387 mailed Jun. 12, 2008, all pages.
U.S. Non-Final Office Action in U.S. Appl. No. 11/234,967 mailed Sep. 10, 2010, all pages.
U.S. Final Office Action in U.S. Appl. No. 11/238,369 mailed Aug. 31, 2010, all pages.
U.S. Non-Final Office Action in U.S. Appl. No. 11/238,369 mailed Mar. 30, 2010, all pages.
U.S. Final Office Action in U.S. Appl. No. 11/244,621 mailed Aug. 18, 2010, all pages.
U.S. Non-Final Office Action in U.S. Appl. No. 11/244,621 mailed Feb. 5, 2010, all pages.
U.S. Final Office Action in U.S. Appl. No. 11/244,621 mailed Sep. 17, 2009, all pages.
U.S. Non-Final Office Action in U.S. Appl. No. 11/244,621 mailed Mar. 19, 2009, all pages.
U.S. Non-Final Office Action in U.S. Appl. No. 11/244,621 mailed Sep. 19, 2008, all pages.
U.S. Non-Final Office Action in U.S. Appl. No. 11/275,245 mailed May 5, 2010, all pages.
U.S. Non-Final Office Action in U.S. Appl. No. 11/275,245 mailed Oct. 22, 2009, all pages.
U.S. Final Office Action in U.S. Appl. No. 11/275,245 mailed Jul. 29, 2009, all pages.
U.S. Non-Final Office Action in U.S. Appl. No. 11/275,245 mailed Sep. 22, 2008, all pages.

(56) References Cited

OTHER PUBLICATIONS

U.S. Final Office Action in U.S. Appl. No. 11/460,516 mailed Mar. 18, 2010, all pages.
U.S. Non-Final Office Action in U.S. Appl. No. 11/460,516 mailed Jun. 26, 2009, all pages.
U.S. Final Office Action in U.S. Appl. No. 11/460,516 mailed Feb. 13, 2009, all pages.
U.S. Non-Final Office Action in U.S. Appl. No. 11/460,516 mailed Sep. 17, 2008, all pages.
U.S. Final Office Action in U.S. Appl. No. 11/496,303 mailed Jul. 22, 2010, all pages.
U.S. Non-Final Office Action in U.S. Appl. No. 11/496,303 mailed Mar. 2, 2010, all pages.
U.S. Non-Final Office Action in U.S. Appl. No. 11/496,303 mailed Sep. 29, 2009, all pages.
U.S. Final Office Action in U.S. Appl. No. 11/496,303 mailed Apr. 1, 2009, all pages.
U.S. Non-Final Office Action in U.S. Appl. No. 11/496,303 mailed Sep. 18, 2008, all pages.
U.S. Non-Final Office Action in U.S. Appl. No. 11/564,431 mailed Jul. 20, 2010, all pages.
U.S. Final Office Action in U.S. Appl. No. 11/564,431 mailed Jan. 4, 2010, all pages.
U.S. Non-Final Office Action in U.S. Appl. No. 11/564,431 mailed Aug. 24, 2009, all pages.
U.S. Final Office Action in U.S. Appl. No. 11/678,653 mailed Jun. 23, 2010, all pages.
U.S. Non-Final Office Action in U.S. Appl. No. 11/678,653 mailed Dec. 16, 2009, all pages.
U.S. Non-Final Office Action in U.S. Appl. No. 11/963,942 mailed Jun. 8, 2010, all pages.
U.S. Non-Final Office Action in U.S. Appl. No. 11/963,945 mailed Jul. 16, 2010, all pages.
U.S. Non-Final Office Action in U.S. Appl. No. 11/963,951 mailed Aug. 2, 2010, all pages.
U.S. Final Office Action in U.S. Appl. No. 12/127,968 mailed Sep. 14, 2010, all pages.
U.S. Non-Final Office Action in U.S. Appl. No. 12/127,968 mailed Mar. 31, 2010, all pages.
U.S. Final Office Action in U.S. Appl. No. 12/127,968 mailed Dec. 1, 2009, all pages.
U.S. Non-Final Office Action in U.S. Appl. No. 12/127,968 mailed Apr. 30, 2009, all pages.
U.S. Non-Final Office Action in U.S. Appl. No. 12/179,752 mailed Dec. 23, 2009, all pages.
U.S. Non-Final Office Action in U.S. Appl. No. 12/179,763 mailed Jan. 4, 2011, 18 pages.
U.S. Final Office Action in U.S. Appl. No. 12/179,767 mailed Aug. 20, 2010, all pages.
U.S. Non-Final Office Action in U.S. Appl. No. 12/179,767 mailed Jan. 22, 2010, all pages.
U.S. Non-Final Office Action in U.S. Appl. No. 12/180,416 mailed Jun. 25, 2010, all pages.
U.S. Final Office Action in U.S. Appl. No. 12/372,887 mailed Apr. 14, 2010, all pages.
U.S. Non-Final Office Action in U.S. Appl. No. 12/372,887 mailed Oct. 16, 2009, all pages.
U.S. Non-Final Office Action in U.S. Appl. No. 12/372,894 mailed Oct. 27, 2009, all pages.
U.S. Final Office Action in U.S. Appl. No. 12/372,917 mailed May 17, 2010, all pages.
U.S. Non-Final Office Action in U.S. Appl. No. 12/372,917 mailed Oct. 26, 2009, all pages.
U.S. Non-Final Office Action in U.S. Appl. No. 12/388,002 mailed Sep. 3, 2010, all pages.
U.S. Final Office Action in U.S. Appl. No. 12/388,139 mailed Jul. 6, 2010, all pages.
U.S. Non-Final Office Action in U.S. Appl. No. 12/388,139 mailed Dec. 15, 2009, all pages.
U.S. Final Office Action in U.S. Appl. No. 12/389,128 mailed Nov. 9, 2010, 50 pages.
U.S. Non-Final Office Action in U.S. Appl. No. 12/389,128 mailed Jun. 2, 2010, all pages.
U.S. Non-Final Office Action in U.S. Appl. No. 12/389,564 mailed Jan. 21, 2011, 13 pages.
U.S. Non-Final Office Action in U.S. Appl. No. 12/389,564 mailed Aug. 23, 2010, all pages.
U.S. Final Office Action in U.S. Appl. No. 12/389,564 mailed Apr. 28, 2010, all pages.
U.S. Non-Final Office Action in U.S. Appl. No. 12/389,564 mailed Nov. 10, 2009, all pages.
U.S. Non-Final Office Action in U.S. Appl. No. 12/390,418 mailed Sep. 28, 2010, 13 pages.
U.S. Non-Final Office Action in U.S. Appl. No. 12/390,420 mailed Oct. 19, 2010, 12 pages.
U.S. Non-Final Office Action in U.S. Appl. No. 12/390,422 mailed Oct. 20, 2010, 13 pages.
U.S. Non-Final Office Action in U.S. Appl. No. 12/413,686 mailed Mar. 17, 2011, 20 pages.
U.S. Final Office Action in U.S. Appl. No. 12/413,686 mailed Jun. 10, 2010, all pages.
U.S. Non-Final Office Action in U.S. Appl. No. 12/413,686 mailed Nov. 30, 2009, all pages.
U.S. Non-Final Office Action in U.S. Appl. No. 10/934,253 mailed Apr. 29, 2011, 11 pages.
U.S. Final Office Action in U.S. Appl. No. 12/389,564 mailed May 19, 2011, 15 pages.
U.S. Non-Final Office Action in U.S. Appl. No. 10/740,138 mailed Jun. 8, 2011, 26 pages.
U.S. Final Office Action in U.S. Appl. No. 11/170,348 mailed Jun. 9, 2011, 14 pages.
U.S. Office Action mailed Aug. 14, 2015 in U.S. Appl. No. 14/294,624, 20 pages.
U.S. Office Action mailed Aug. 24, 2015 in U.S. Appl. No. 14/287,339, 20 pages.
U.S. Office Action mailed Nov. 27, 2015 in U.S. Appl. No. 14/294,624, 11 pages.
U.S. Office Action mailed Jan. 4, 2016 in U.S. Appl. No. 13/482,497, 22 pages.

\* cited by examiner

DETERMINING DEVICE THAT PERFORMS PROCESSING OF OUTPUT PICTURES

CROSS-REFERENCE TO RELATED APPLICATION

This application is a divisional of U.S. patent application having Ser. No. 10/761,777, filed on Jan. 21, 2004, which is incorporated by reference herein in its entirety.

TECHNICAL FIELD

This disclosure relates in general to the field of television systems, and more particularly, to the field of interactive television.

BACKGROUND OF THE DISCLOSURE

With recent advances in digital transmission technology, subscriber television systems are now capable of providing much more than the traditional analog broadcast video. In implementing enhanced programming, the home communication terminal ("HCT"), otherwise known as the set-top box, has become an important computing device for accessing content services (and content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT can be downloaded and/or updated via the subscriber television system. Each DHCT also typically includes a processor, input/output capabilities, communication components, and memory, and is connected to a television set or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

Technological advances now permit generation and transmission of a variety of higher resolution pictures and video formats. Coincident with the advancing technology of transmission equipment is the technological improvements of the DHCTs and the television set to receive and display a plurality of video formats. There are a wide range of television sets available today, including the conventional cathode ray tube (CRT) styles, overhead projection, rear projection, liquid crystal display based technology, and plasma television sets that can be mounted on a wall. These variations in television sets often lead to a wide variety of characteristics that affect processing of a television picture for display. A sourced television or video signal is typically processed for display by considering its characteristics, as well as the TV set's characteristics such as the size of the screen, the aspect ratio of the display, and whether the display implements an interlaced or progressive scan format, among other characteristics. Due to the increasing complexity and variation of DHCTs and television sets (and thus a multitude of characteristics to consider in processing a video signal), connecting a television set to, or otherwise communicating with, a DHCT and achieving a viewable picture and a desired display quality is often a challenge to even the most technologically adept. Thus a need exists in the industry to address the aforementioned and/or other deficiencies and/or inadequacies.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
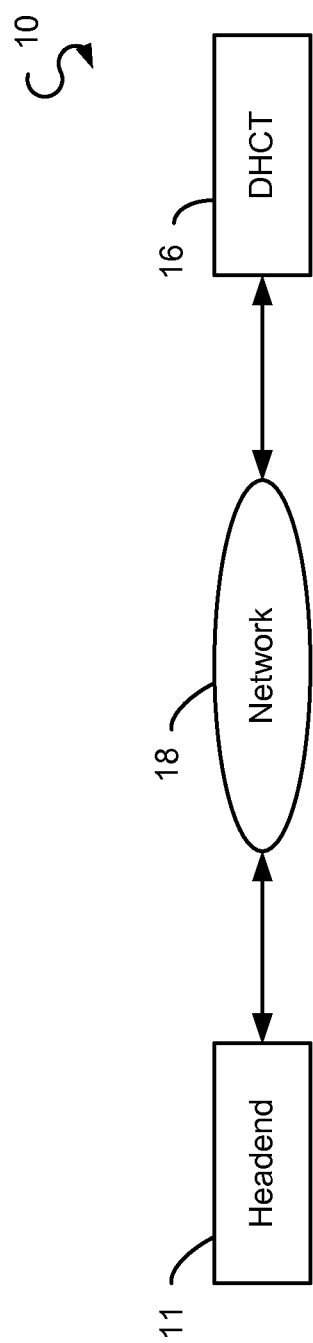
FIG. 1 is a block diagram depicting an example subscriber television system (STS), in accordance with one embodiment of the disclosure.

The preferred embodiments of the disclosure now will be described more fully hereinafter with reference to the accompanying drawings. The preferred embodiments of the disclosure include systems and methods that provide an interactive session with a user to determine the characteristics of a television set or other display device coupled to a digital home communication terminal (DHCT).

Video formats can vary in picture size, frame rate, and on whether pictures are progressive or interlaced. A progressive picture constitutes all the lines of a frame whereas an interlaced picture has a top field and bottom field of alternating lines to constitute a complete frame. An interlaced picture is displayed during respective field intervals. Video formats can further vary in other attributes or characteristics such as color format, color primaries, picture width-to-height aspect ratio, and width-to-height aspect ratio of the individual picture elements, or pixels, that make-up the picture.

As a non-limiting example, the video formats of a compressed digital television signal processed in a DHCT for display include formats specified by ATSC (Advanced Television Systems Committee) Digital Television Standard A/54 and include the characteristics described above. An analog television signal such as a NTSC (National Television System Committee) television signal can be processed for display as well.

As there are multiple video formats for a sourced television signal, there are also multiple physical output interfaces or connectors (or similarly, ports) in the DHCT from which a DHCT-processed television signal can be output. The processed signal that is output through a physical output interface complies with the format specification of that interface. An interface specification, such as a video interface specification, can also include mechanisms for providing ancillary data. For example, the provision of close-caption text within a video signal may be part of the video interface specification.

In addition to possible differences in signaling and physical characteristics, video interface specifications can differ in one or more parameters that pertains to the characteristics of the video picture. For instance, parameters that can differ in value in distinct video interface specifications include picture size, frame rate, whether pictures are progressive or interlaced, color format, colorimetry, picture width-to-height aspect ratio, width-to-height aspect ratio of pixels, and if and how ancillary data is provided.

A video interface specification can allow for one or more picture parameters to take different values. For instance, the value of a colorimetry parameter may differ according to the video picture's colorimetry. Furthermore, a video interface specification can support multiple sets of a combination of parameter values that specify the characteristics of the picture. The parameters that can take different values in the multiple sets of a combination of parameters correspond to characteristics that may include picture size, frame rate, whether pictures are progressive or interlaced, color format, colorimetry, picture width-to-height aspect ratio, width-to-height aspect ratio of pixels, and if and where ancillary data is carried. For instance, the SMPTE (Society of Motion Picture and Television Engineers) 274 specification supports multiple input and output picture formats, such as 1920× 1080 interlaced or progressive pictures, one of various frame rates, and RGB or YPbPr encoded pixels. SMPTE 296 specifies 1280×720 progressive pictures for input and output.

A physical output interface or connector can further serve to output video signals corresponding to one or more video format specifications. For instance, the physical connector trio used to output component analog video as YPbPr could be configured to output a television signal as an RGB component analog video signal. As another non-limiting example, a physical output interface can be used to output a television signal compliant to SMPTE 274 or SMPTE 296.

It would be understood by those having ordinary skill in the art that other specifications and/or standards can be used that will include the same, fewer, more, or different parameters and yet be considered within the scope of the preferred embodiments of the disclosure. Consequently, a DHCT configured in accordance with the preferred embodiments determines the video formats supported by the television set or other display device connected to the DHCT. Responsive to these determinations, the DHCT can then set its video output format, resolution of graphics overlays, and closed caption support accordingly and process sourced television signals accordingly.

The systems and methods of the preferred embodiments of the disclosure will be described in the context of a subscriber television system, and particularly, a DHCT that is connected to a TV set, although other systems that include communication with an interactive display are considered to be within the scope of the disclosure. Additionally, reference herein will be made to physical output ports with the understanding that physical output ports include ports, connectors, and physical interfaces, including wireless interfaces. Since the preferred embodiments of the disclosure can be understood in the context of a subscriber television system, one such example system is described below, with further description of the DHCT and headend components. Following the description of these components is an example method of the preferred embodiments of the disclosure, followed by some illustrations of some example interactive sessions of a discovery procedure that can be used to determine the display device characteristics to enable a quality picture to be displayed.

The disclosure may, however, be embodied in many different forms and should not be construed as limited to the embodiments set forth herein; rather, these embodiments are provided so that this disclosure will be thorough and complete, and will fully convey the scope of the disclosure to those of ordinary skill in the art. Furthermore, all "examples" given herein are intended to be non-limiting and among others not shown but understood to be within the scope of the disclosure.

I. Subscriber Television System

FIG. 1 is a block diagram depicting an example subscriber television system (STS) 10, in accordance with one embodiment of the disclosure. In this example, the STS 10 includes a headend 11 and a digital home communication terminal (DHCT) 16 that are coupled via a communications network 18. It will be understood that the STS 10 shown in FIG. 1 is merely illustrative and should not be construed as implying any limitations upon the scope of the preferred embodiments of the disclosure. For example, although single components (e.g., a headend 11 and a DHCT 16) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the disclosure include systems not utilizing physical structured cabling for transmission, such as, but not limited to, satellite systems and terrestrial-broadcast systems.

The DHCT 16 is typically situated at the residence or place of business or recreation of a user and may be a stand-alone unit or integrated into a television set, a personal computer, or other display devices, or an audio device, among other media devices. The DHCT 16 receives content (video, audio and/or other data) from the headend 11 through the network 18 and in some embodiments, provides reverse information to the headend 11 through the network 18.

The headend 11 receives content from one or more content providers (not shown), including local providers. The content is processed and/or stored and then transmitted to client devices such as the DHCT 16 via the network 18. The headend 11 may include one or more server devices (not shown) for providing content to the DHCT 16. The headend 11 and the DHCT 16 cooperate to provide a user with television services via a television set (not shown). The television services may include, for example, broadcast television services, cable television services, premium television services, video-on-demand (VOD) services, and/or pay-per-view (PPV) services, among others.

II. Headend

Figure 2:
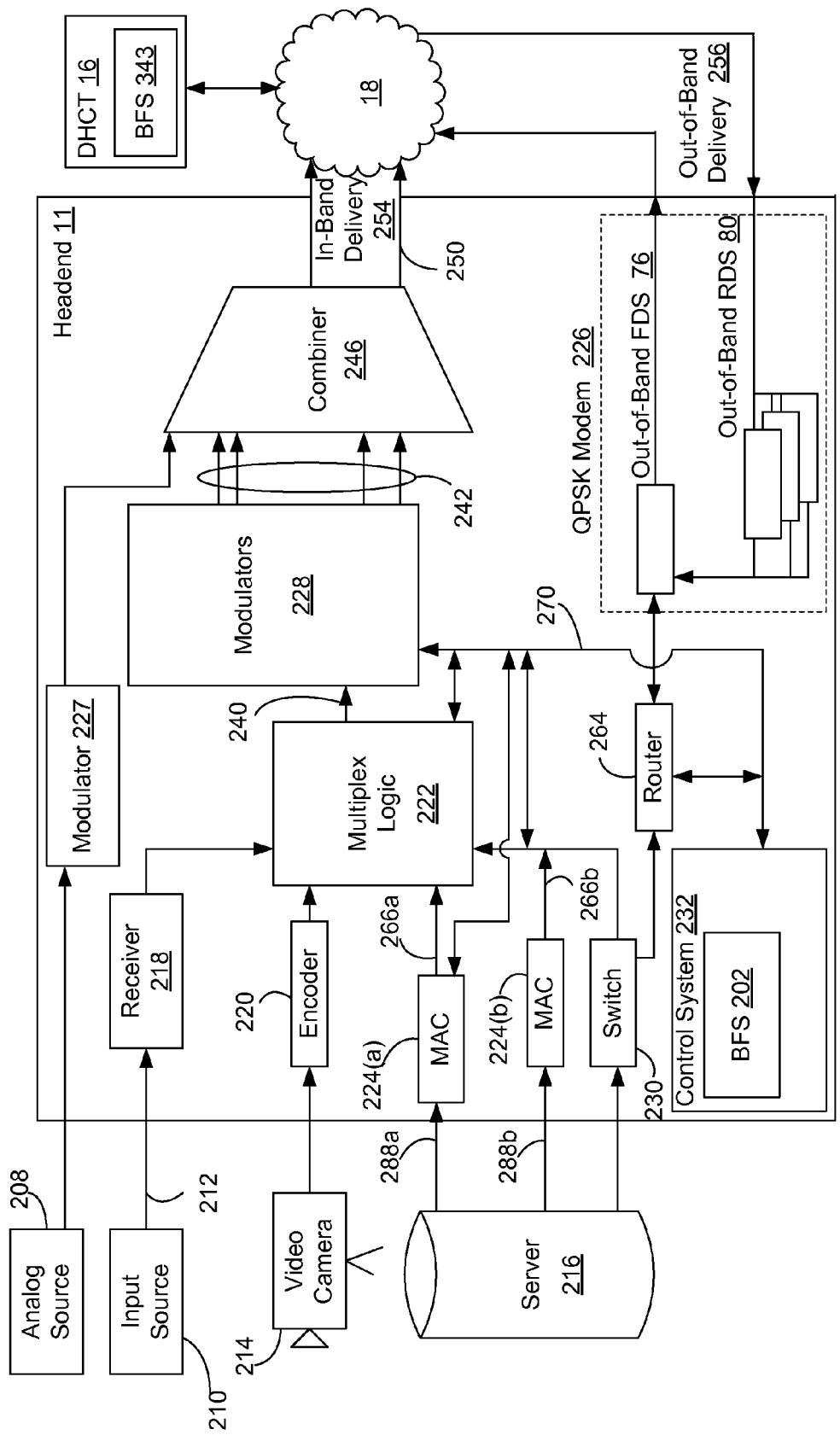
FIG. 2 is a block diagram depicting an example headend shown in the STS of FIG. 1, in accordance with one embodiment of the disclosure.

FIG. 2 is an overview of one example headend 11, which provides the interface between the STS 10 (FIG. 1) and the service and content providers. The overview of FIG. 2 is equally applicable to a hub (not shown), and the same elements and principles may be implemented at a hub instead of the headend 11. It will be understood that the headend 11 shown in FIG. 2 is merely illustrative and should not be construed as implying any limitations upon the scope of the preferred embodiments of the disclosure. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown) and terrestrial broadcast transmitters and antennas (not shown). The headend 11 can also receive content from a direct feed source 210 via a direct line 212. Other input sources from content providers include a video camera 214, an analog input source 208, and/or an application server 216. The application server 216 may include more than one line of communication. One or more components such as the analog input source 208, the direct feed source 210, the video camera 214, and the application server 216 can be located external to the headend 11, as shown, or internal to the headend 11 as would be appreciated by one having ordinary skill in the art. The signals provided by the content or programming input sources can include a single content instance (e.g., a program episode or show) or a multiplex that includes several content instances.

The headend 11 generally includes one or more receivers 218 that are each associated with a content source. MPEG (Motion Picture Experts Group) encoders, such as encoder 220, are included for digitally encoding local programming or a real-time feed from the video camera 214 or the like. The encoder 220 outputs the respective compressed video and audio streams corresponding to the analog audio/video signal received at its input. For example, the encoder 220 can output formatted MPEG-2 or MPEG-1 packetized elementary (PES) streams or transport streams compliant to the syntax and semantics of the ISO (International Organization for Standardization) MPEG-2 standard, respectively. The PES or transport streams may be multiplexed with input signals from a switch 230, receiver 218 and control system 232. The multiplexing logic 222 processes the input signals and multiplexes at least a portion of the input signals into a transport stream on connection 240. Analog input source 208 can provide an analog audio/video broadcast signal that can be input into a modulator 227. From the modulator 227, a modulated analog output signal can be combined at combiner 246 along with other modulated signals for transmission into transmission medium 250. Alternatively, analog audio/video broadcast signals from the analog input source 208 can be input into the modulator 228. Alternatively, an analog audio/video broadcast signal can be input directly from the modulator 227 to the transmission medium 250. The analog broadcast content instances are transmitted via respective RF channels, each assigned for transmission of an analog audio/video signal such as NTSC video.

A switch, or switches, such as asynchronous transfer mode (ATM) switch 230, provide an interface to an application server 216. There can be multiple application servers 216 providing a variety of services such as a pay-per-view service, including video on demand (VOD), a data service, an Internet service, a network system, or a telephone system. Service and content providers may download content to an application server located within the STS 10. The application server 216 may be located within the headend 11 or elsewhere within the STS 10, such as in a hub. The various inputs into the headend 11 are then combined with the other information from the control system 232, which is specific to the STS 10, such as local programming and control information, which can include, among other things, conditional access information. The headend 11 contains one or more modulators 228 to convert the received transport streams on connection 240 into modulated output signals suitable for transmission over the transmission medium 250 through the network 18. Each modulator 228 may be a multimodulator including a plurality of modulators, such as, but not limited to, QAM (quadrature amplitude modulation) modulators, that radio frequency modulate at least a portion of the transport streams on connection 240 to become output transport streams on connections 242. The output signals on connections 242 from the various modulators 228 or multimodulators are combined, using equipment such as the combiner 246, for input into the transmission medium 250, which is sent via the in-band delivery path 254 to subscriber locations, such as the DHCT 16.

In one embodiment, the server 216 also provides various types of data on connections 288a, 288b to the headend 11. The data, in part, is received by the media access control (MAC) functions 224 that output MPEG transport packets containing data on connections 266a, 266b instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream provided on connection 240.

Among other things, the control system 232 provides input to the modulator 228 for setting operating parameters, such as selecting certain content instances or portions of the transport streams for inclusion in one or more output transport stream on connections 242, system specific MPEG table packet organization, and/or conditional access information. Control information and other data can be communicated to hubs and DHCTs 16 via an in-band delivery path 254 or via an out-of-band delivery path 256.

The out-of-band data is transmitted via the out-of-band forward data signal (FDS) 76 of the transmission medium 250 by mechanisms such as, but not limited to, a QPSK (quadrature phase-shift keying) modem array 226. Two-way communication utilizes the reverse data signal (RDS) 80 of the out-of-band delivery path 256. Hubs and DHCTs 16 transmit out-of-band data through the transmission medium 250, and the out-of-band data is received in the headend 11 via the out-of-band RDS 80. The out-of-band data is routed through router 264 to the application server 216 or to the control system 232. The out-of-band control information includes such information as, among many others, a pay-per-view purchase instruction and a pause viewing command from the subscriber location to a video-on-demand type application server located internally or external to the headend 11, such as the application server 216, as well as any other data sent from the DHCT 16 or hubs, all of which will preferably be properly timed.

The control system 232 also monitors, controls, and coordinates all communications in the subscriber television system 10 (FIG. 1), including video, audio, and data. The control system 232 can be located at the headend 11 or remotely. The control system 232 also includes a broadcast file system (BFS) server 202 that provides content to the DHCT 16. A broadcast file system preferably carries data formatted in directories and files by the BFS server 202, which is used for producing and transmitting data streams throughout the STS 10, and which provides an efficient means for the delivery of application executables and application content (e.g., data) to the DHCT 16. In particular, the BFS server 202 and its counterpart, a BFS client module 343 in the DHCT 16, are part of the broadcast file system. The BFS server 202 repeatedly sends content to the DHCT 16 over a period of time in a cyclical manner so that the DHCT 16 may access the content as needed.

The transmission medium 250 distributes signals from the headend 11 to the other elements in the subscriber television system 10 (FIG. 1), such as a hub, a node (not shown), and subscriber locations. The transmission medium 250 can incorporate one or more of a variety of media, such as optical fiber, coaxial cable, and HFC, satellite, direct broadcast, or other transmission media.

III. DHCT and Remote Control Device

Figure 3A:
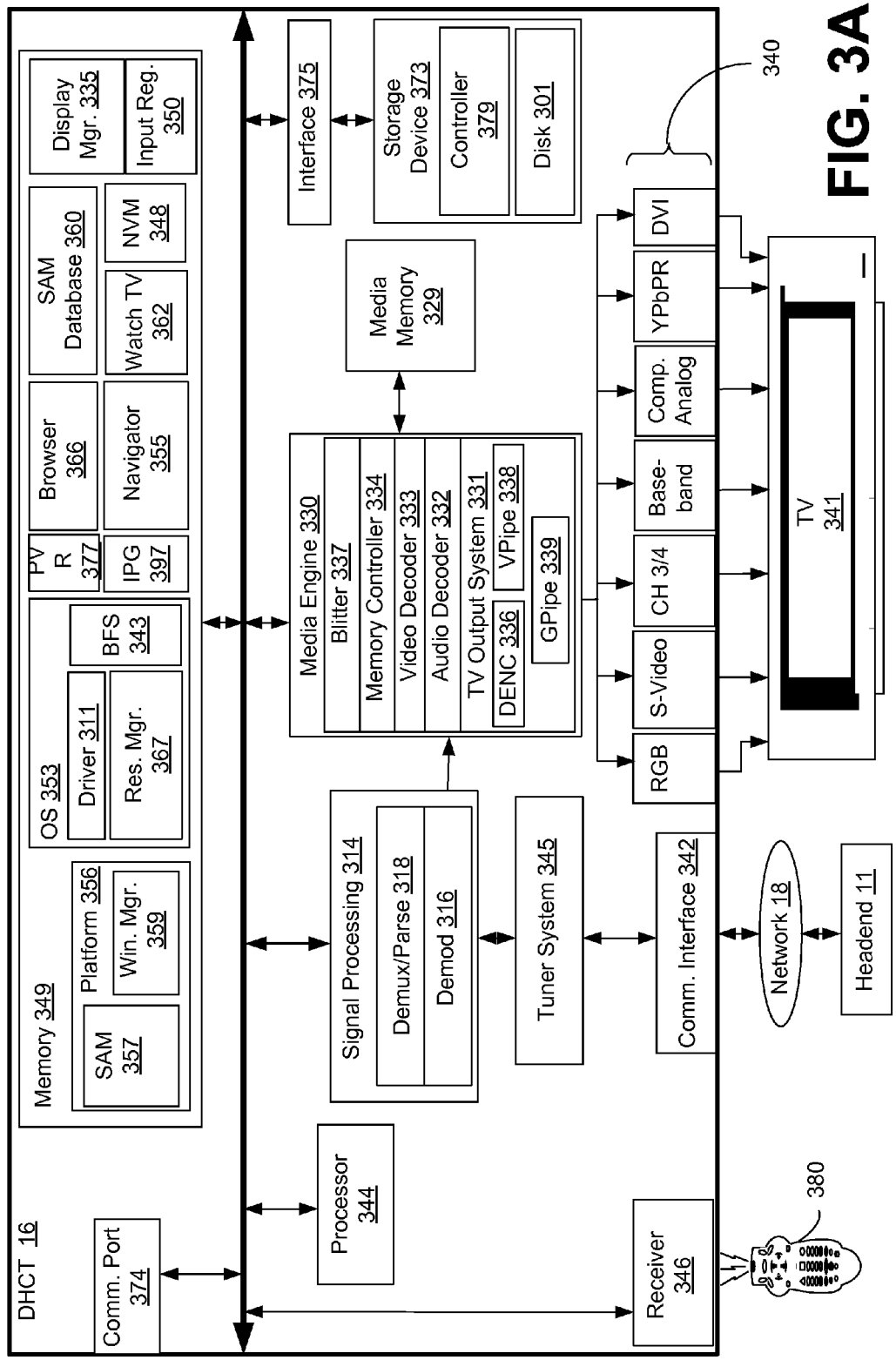
FIG. 3A is a block diagram depicting an example digital home communication terminal (DHCT) shown in the STS of FIG. 1, which is coupled to the example headend of FIG. 2 and a television, in accordance with one embodiment of the disclosure.

FIG. 3A is a block diagram illustration of an example DHCT 16 that is coupled to the headend 11 and a television set 341, in accordance with one embodiment of the disclosure. It will be understood that the DHCT 16 shown in FIG. 3A is merely illustrative and should not be construed as implying any limitations upon the scope of the preferred embodiments of the disclosure. For example, some of the functionality performed by applications executed in the DHCT 16 (such as the IPG application 397) may instead be performed completely or in part at the headend 11 and vice versa, or not at all in some embodiments. A DHCT 16 may be a stand-alone unit or integrated into another device such as, for example, a television set or a personal computer or other display devices or an audio device, among others. The DHCT 16 preferably includes a communications interface 342 for receiving signals (video, audio and/or other data) from the headend 11 through the network 18, and provides for reverse information to the headend 11 through the network 18.

The DHCT 16 preferably includes one or more processors, such as processor 344, which controls the functions of the DHCT 16 via a real-time, multi-threaded operating system (O.S.) 353 that enables task scheduling and switching capabilities. The DHCT 16 also includes a tuner system 345 comprising one or more tuners for tuning into a particular television channel or spacing in the radio-frequency spectrum to display content and for sending and receiving various types of content to and from the headend 11. The tuner system 345 can select from a plurality of transmission signals provided by the subscriber television system 10 (FIG. 1). The tuner system 345 enables the DHCT 16 to tune to downstream content transmissions, thereby allowing a user to receive digital and/or analog content delivered in the downstream transmission via the subscriber television system 10. The tuner system 345 includes, in one embodiment, an out-of-band tuner for bi-directional QPSK (or QAM in some embodiments) communication and one or more QAM tuners (in band) for receiving television signals. Additionally, a receiver 346 receives externally generated information, such as user inputs or commands from an input device, such as a remote control device 380.

Figure 3B:
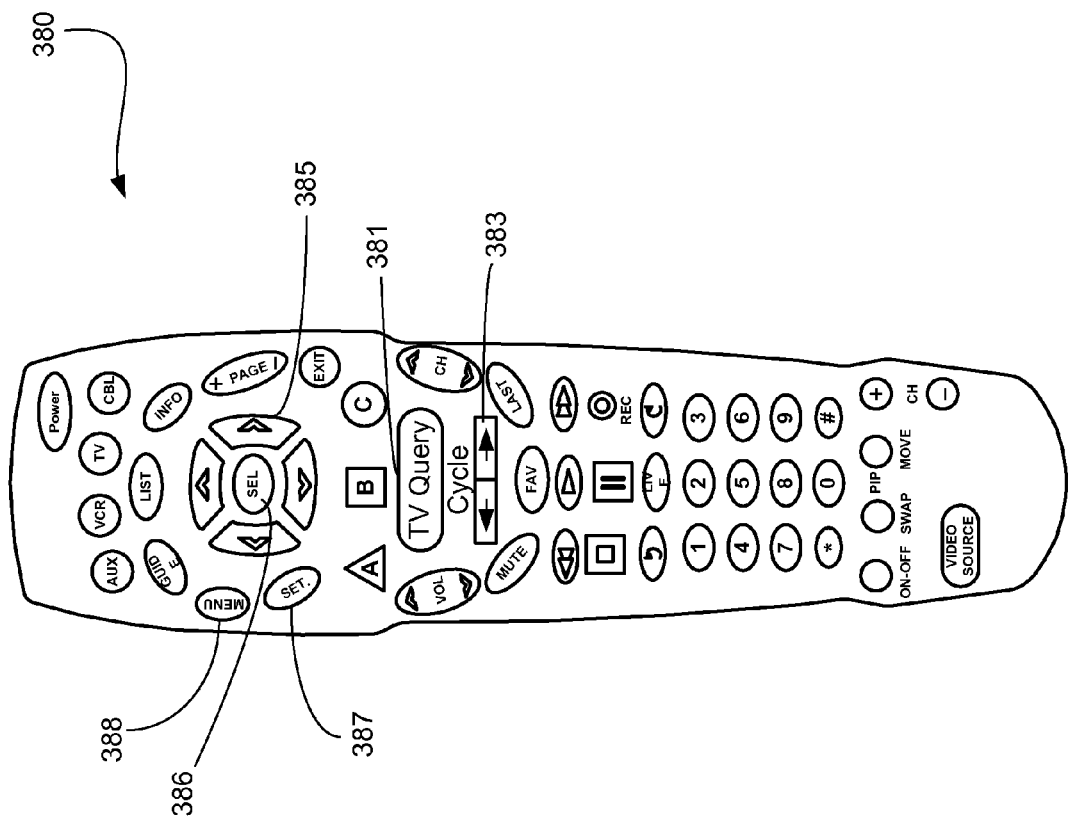
FIG. 3B is a schematic diagram of the example remote control device shown in FIG. 3A, in accordance with one embodiment of the disclosure.

FIG. 3B is a schematic diagram of the example remote control device 380 illustrated in FIG. 3A, in accordance with one embodiment of the disclosure. The example remote control device 380 includes a select button 386 for making selections on a display screen, navigation buttons 385 for navigating within a particular display screen, a menu button 388 for accessing other screens, such as a general settings screen, and a quick settings button 387 to access a quick settings display screen wherein various parameters can be changed. In one embodiment, the remote control device 380 further includes a TV capabilities query button 381 that, when selected, enables a user to invoke a discovery procedure that prompts a series of user interfaces for determining characteristics of the TV set 341. In addition, the remote control device 380 can include a cycle button 383 that, when selected, cycles the DHCT output of a processed television signal between two or more preset formats for driving the TV set 341 through one or more physical output connections. The preset formats are preferably set by the user during the discovery procedure. Many alternative methods of providing user input may be used including a remote control device with different buttons and/or button layouts, a keyboard device, a voice activated device, etc. The embodiments of the disclosure described herein are not limited by the type of device used to provide user input.

Referring again to FIG. 3A, the DHCT 16 processes analog and/or digital transmission signals for storage in a storage device 373 such as an optical or hard disk drive, and/or for display to the television set 341. The DHCT 16 preferably includes a signal processing system 314 and a media engine 330. One or more of the systems of the signal processing system 314 can be implemented with software, a combination of software and hardware, or preferably in hardware. The signal processing system 314 includes a demodulating system 316 and a demultiplexer/parser 318. The demodulating system 316 comprises functionality for demodulating an analog transmission signal or a differently modulated signal carrying digital transmission signals or information. For instance, the demodulating system 316 can demodulate a signal in the tuned frequency spacing that was modulated, among others, as a QAM-modulated signal that carries compressed digital television signals or information. The demultiplexer/parser 318 can include MPEG-2 transport demultiplexing. For example, when tuned to frequency spacings carrying a digital transmission signal, the demultiplexer/parser 318 enables the separation of packets of data corresponding to one or more desired video and audio streams of one or more television signals for further processing. Concurrently, the demultiplexer/parser 318 precludes further processing of packets in the multiplexed transport stream that are irrelevant or not desired, such as packets of data corresponding to other video streams. Thus, the components of the signal processing system 314 are capable of QAM demodulation, forward error correction, and demultiplexing of MPEG-2 transport streams, and parsing of elementary streams and packetized elementary streams. Additional components, not shown, include conditional access components, as well as, among others, an analog video decoder for processing an analog transmission signal and, in one implementation, a compression engine for converting a decoded analog transmission signal to compressed audio and video streams that are produced in accordance with the syntax and semantics of a designated audio and video coding method, such as specified by the MPEG-2 audio and MPEG-2 video ISO standard, among others.

The signal processing system 314 outputs packetized compressed streams and presents them as input for storage in the storage device 373, or in other implementations, as input to the media engine 330 for decompression by a video decoder (or video decompression engine) 333 and an audio decoder (or audio decompression engine) 332 for display on the TV set 341 via the output system 331 and output connections 340. One having ordinary skill in the art will appreciate that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or system memory 349 (and/or dedicated memory for a particular component) to facilitate data transfer and/or processing of the video and/or audio signal for display and/or storage.

The media engine 330 includes the digital video decoder 333, digital audio decoder 332, a memory controller 334, a blitter 337, and the output system 331. The media engine 330 is capable of graphics data generation and graphics data processing capabilities with functional modules such as the blitter 337, which is a functional 2-D (i.e., 2-dimensional) DMA (Direct-Memory-Access) module, often referred to as a blit engine. The functionality in the blitter 337 allows for graphical data or image data stored in a media memory 329 or system memory 349 to be read into the media engine 330, processed, and written back (i.e. output) to memory. The graphical data or image data is read in some predetermined 2-D order, such as raster scan order, and processed in systematic, pipelined-fashion through one or more functional elements in the blitter 337. Processing through the blitter 337 can cause one or more pixels of the input image to be changed to a new value. The output image to memory is representative of a pre-specified set of blitter operations.

During the course of program execution, the processor 344 writes operation settings and/or parameters to registers in the media engine 330 to effect one or more operations in one or more input images to be processed through the blitter 337. Typically, the processor 344 sets the registers prior to invoking the blit operation.

According to the mode set for the blit operation, the number of input pixels read from an input image in a blit operation may be less than, equal to, or more than the number of output pixels produced and written back to memory. According to the mode set in registers, a blit operation may comprise of reading multiple input images to produce an output image, such as an alpha-blending operation on two input images. A blit operation may be also set to produce more than one output image. A blit operation may further be set to process pixels of an input image conditionally (e.g., only if they have a certain value or meet certain conditions).

Blitter functionality further includes a scaling capability that can be employed to effect vertical and/or horizontal scaling of an input image. Thus, an input image can be upscaled or downscaled according to the operational mode and parameters written to the corresponding blitter registers. Such scaling operations can be used to modify the aspect ratio of an input image, for example, from a 4 by 3 aspect (i.e., 4:3) ratio (horizontal to vertical ratio) to a 16 by 9 (i.e., 16:9) aspect ratio. Furthermore, the blitter 337 can be set to perform color conversion or alter the color of an input image.

The scaling functionality in the blitter 337 can be performed with sample-rate converters or scaling filters of multiple taps and phases, as known to those practicing digital signal processing in the state-of-art.

As described previously, the blitter 337 is capable of scaling an input image with a 4:3 aspect-ratio to another aspect-ratio, such as a 16:9, although often at the expense of introducing distortion. The blitter 337 can further be set for the blit operation to crop the boundaries of the input image, prior to conducting the scaling operation, by simply omitting to read (or input) parts of the input image from memory. The blitter 337 can also crop the boundaries of the input image it is processing after conducting the scaling operation by simply omitting to write (or output) parts of the input image to memory. For instance, the blitter 337 is capable of processing an image and cropping it by omitting to write to media memory 329 a pre-specified top and bottom portion or rectangular sections. The left and right exterior portions, or pillars, of an input image can be similarly cropped.

As described previously, the blitter 337 possesses capability to perform color conversion on each pixel of the input graphical data from one color format to another color format. For example, color conversion may comprise converting an input image from an RGB color format to a YPbPr color format, or vice-versa.

Color conversion may also comprise conversion between color primaries specifications, such as from the color primaries specified in ITU-R (International Telecommunication Union-Radiocommunication) Recommendation BT.601 to the color primaries specified ITU-R Recommendation BT.709. In one embodiment, color conversion is employed to create an image that is displayed during an interactive discovery phase to determine the color "temperature" of a TV set or display attached to the DHCT 16.

The blitter 337 further possesses capability to perform a color transformation that represents a non-linear transfer-function from input to output to correct for the perceived intensity (i.e., lightness) of the type of TV set 341 or display driven by the DHCT 16. This color transformation could be for the purpose of what is often called by practitioners in the state of the art as gamma correction (i.e., correction of perceived intensity), or the color transformation can be for other purposes that assist in the TV discovery phase.

All aforementioned blitter operations as well as other blitter operations, as a whole or any combination thereof, may be employed to create images for use during the TV discovery phase.

The media engine 330 processes and feeds data for output via the output system 331 to a television set 341. The output system 331 is configured (e.g., by the processor 344) to convert processed video and graphical pictures that are composited by the media engine 330 to a video signal for output, such signal consistent with the format and signaling specification of a port in the set of physical output ports 340 in the DHCT 16. As an example, the output system 331 includes a digital video encoder (DENC) 336 that converts reconstructed video data (or pictures) fed (or otherwise received) at its input to an analog video signal that is output through a port in the set of physical output ports 340 to drive a TV display connected to the DHCT 16. In one embodiment, the same output video signal is output simultaneously through a plurality of ports in the set of physical output ports 340.

The set of physical output ports 340 may comprise of physical connectors for which one end of a corresponding physical cable is attached to, while the opposite end of the cable is attached to a corresponding physical connector in the TV set 341 (or display). A physical connector in the set of physical output ports 340 may also be a wireless transmitter or emitter device that emits the video signal to a corresponding wireless receiver in the TV set 341. An auxiliary device, such as a second TV display, may be also be connected between the DHCT 16 and the TV set 341 through a second set of corresponding connectors.

A physical connector in the set of physical output ports 340 may also serve as both input and output, as input, or as an asymmetrical output-input port wherein video and audio are output to the TV set 341 and the TV set's display status and/or capabilities, characteristics, or attributes are input to the DHCT 16.

Data is fed to one of the physical output ports 340 sourced from the media engine memory 329 or memory 349 in a manner to produce a raster scan of displayed pixels consistent with the interface or port of the physical output ports 340 in which the display type is connected to the DHCT 16. As is described below, the output system 331, under the direction of a display manager 335 and in cooperation with the processor 344 and operating system 353, provides a formatted signal to one or more ports of the physical output ports 340 that are coupled to corresponding inputs (not shown) at the TV set 341, or at other devices such as a VCR, among others. The physical output ports 340 include a RGB port, a S-Video port, a channel 3/4 port, a baseband port, component analog port, and/or a YPbPr port. TV signals are formatted by the DHCT 16 according to well-known video interface specifications. For example, TV signals routed to the baseband port are formatted by the DHCT 16 according to a baseband video format specification. Baseband video can be analog NTSC (or PAL or SECAM) baseband video. Similarly, TV signals routed to the Ch. 3/4 RF (radio frequency) output port are formatted as RF. The S-video port is for S-video, which is the same as baseband video except that the luminance and chroma are transferred on separate wires. YPrPb is an analog component interface that is popular in early HDTV displays. It couples luminance (Y) and two color difference signals (Pr and Pb) to the display device. The same components when digitized are referred to as Y, Cr and Cb. Other connections of the physical output ports 340 include a digital video interface (DVI) to drive a TV set or display that receives non-compressed digital TV signals at its input, and/or an IEEE-1394 interface (not shown) to drive a TV set or display with a possibly-compressed digital TV signal, among others. DVI is a digital interface often used to transmit HDTV signals to a display. In some embodiments, some interfaces, such as the DVI interface or interfaces or ports not shown, can be bi-directional.

A display buffer (not shown) in media memory 329 is designated for the displayable graphical data. The memory controller 334 in the media engine 330 grants access to transfer data from system memory 349 or other sections of media memory 329 to the display buffer in a timely way that safeguards from the generation of tear artifacts on the TV display. For instance, data transfer can be granted to locations in the display buffer corresponding to locations already passed by the raster-scan ordered data fed from the display buffer into the DENC 336. Thus, data written to the display buffer is always behind (in raster-scan order) the display buffer locations read and fed into the output system 331. Alternatively, data can be written to a secondary display buffer (not shown), also called an off-screen or composition buffer and the display buffer and the off-screen buffer can be logically swapped, for example, during the vertical blanking interval of the output TV signal.

Under the arbitration of the memory controller 334, the audio decoder 332 and the video decoder 333 decode the compressed audio and video signals stored in compressed buffers (not shown) in the media memory 329 to obtain the corresponding audio and video data in an uncompressed format. The reconstructed or uncompressed audio and video data are stored in uncompressed buffers (not shown) in the media memory 329. The process of decoding is coordinated by the memory controller 334 such that each of the decoders 332 and 333 are granted access or authorization every time the respective decoder imports data from or exports data to the media memory 329. Data stored in the decoded buffers may be fed to the output system 331 and the audio output system (not shown) under the arbitration of the memory controller 334. The audio output system may be part of the output system 331 and may include digital-to-analog converters (DACs).

The output system 331, for instance, includes a DENC 336 that provides a video output via physical output ports 340 while the audio DAC (not shown) provides an audio output via an audio connection (not shown). The video signal, which has been converted and possibly composited with graphics, is formatted appropriately for output via the output system 331 in cooperation with the display manager 335, operating system 353, and processor 344, in accordance with a video interface type and a video format of the display device that is receiving the video output (e.g., high definition television (HDTV), NTSC or phase alternate line (PAL)).

The output system 331 comprises capabilities to convert processed video and graphical pictures simultaneously for output. A video display pipeline (VPipe) 338 in the output system 331 receives (or is fed) video pictures from the media memory 329 and processes the pictures for output in a systematic fashion. In one embodiment, the video display pipeline 338 includes (not shown) one or more line buffers and vertical sample-rate converters to effect vertical resizing, horizontal sample-rate converters to effect horizontal resizing, and/or in-line color-conversion capabilities. Furthermore, the video display pipeline 338 may include memory and circuit logic (programmable in some embodiments) to effect picture de-interlacing of interlaced pictures for display as progressive or as larger interlaced pictures. The de-interlacing process may involve the access of the media memory 329 to read a plurality of lines from one or more fields corresponding to one or more consecutive video pictures from a TV signal to process them and generate each line of a converted video picture.

A graphics display pipeline (GPipe) 339 in the output system 331 receives (or is fed) graphical pictures or data from a display buffer in media memory 329 and processes the images for output in a systematic fashion. The graphics display pipeline 339 may include (not shown) one or more line buffers and/or vertical scalers (e.g., sample-rate converters) to effect vertical resizing. The graphics display pipeline 339 can also have horizontal scalers or sample-rate converters to effect horizontal resizing, and/or in-line color-conversion capabilities to effect color conversion.

The output system 331 further includes programmable digital logic and control circuitry (not shown), among other circuitry, to overlay or composite the converted graphical picture at the end of the graphics display pipeline over the converted video picture at the end of the video display pipeline 338 (or vice versa). The converted graphical picture and the converted video picture may be composited with a common center but do not have to be of the same picture resolution. For instance, the converted video picture may span a 1280×720 picture of 16:9 aspect ratio while the graphical picture may span a 960×720 picture of 12:9 (or equivalently 4:3) aspect ratio.

The output system 331 further comprises programmable digital logic and control circuitry (not shown) to enable and disable the video display pipeline 338, to enable and disable the graphics display pipeline 339, and/or to alpha blend the spatially corresponding pixels output by the two respective display pipelines 338,339 to appear as a mix (or translucent) picture that is output to the TV set 341. Some pixels in the graphical picture may have a transparent color value.

The output system 331 preferably generates a TV signal for output to the TV set 341 according to the specification of the video interface used for a particular output port 340. If the video display pipeline 338 is disabled, a graphical picture is displayed on the screen of TV set 341. If the graphical display pipeline 339 is disabled, the video picture (e.g., from a tuned TV channel, from the storage device 373, etc.) is displayed on the TV set 341. In one embodiment, the DHCT 16 performs an interactive discovery session to find the TV set display or TV set characteristics by outputting simultaneously a TV signal through a first output port of the physical output ports 340 and another TV signal through a second output port of the physical output ports 340. For example, a first video display pipeline (not shown) of the video display pipeline 338 in the output system 331 is employed to convert a video picture for output through the aforementioned first output port of the physical output ports 340 and a second video display pipeline (not shown) of the video display pipeline 338 in the output system 331 is employed to convert the same or different video picture for output through the aforementioned second output port of the physical output ports 340.

In another embodiment, a first video display pipeline (not shown) of the video display pipeline 338 and a first graphics display pipeline (not shown) of the graphics display pipeline 339 in the output system 331 are employed during the discovery phase to output a TV signal through an output port (e.g., a first output port) of the physical output ports 340 as either a video picture or as a composition of a video picture and a graphical picture. A second video display pipeline (not shown) of the video display pipeline 338 in the output system 331 is employed to output a TV signal through another (e.g., a second) output port of the physical output ports 340.

In another embodiment, a second graphics display pipeline (not shown) of the graphics display pipeline 339 is also employed (along with a second video display pipeline) during the discovery phase to output a TV signal through the second output port as either a video picture or as a composition of a video picture and a graphical picture.

The DHCT 16 can include one or more storage devices, such as storage device 373, preferably integrated into the DHCT 16 through an interface 375 (e.g., IDE (integrated drive electronics) or SCSI (small computer system interface), etc.), or externally coupled to the DHCT 16 via a communication port 374. The communication port 374 can be a wireless or wired interface, and is for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The storage device 373 can be optical (e.g. read/write compact disc), but is preferably a hard disk drive. The storage device 373 includes one or more media, such as a hard disk 301. A storage device controller 379 in the storage device 373 of DHCT 16, in cooperation with a device driver 311 and the operating system 353, grants access to write data to or read data from the local storage device 373. The processor 344 can transfer content (e.g., data) from memory 349 to the local storage device 373 or from the local storage device 373 to the memory 349 by communication and acknowledgement with the storage device controller 379.

In one embodiment, data stored, written, and retrieved from the storage device 373 includes one or more images to be processed during a discovery phase to determine the type of TV set or display attached to or otherwise in communication with the DHCT 16 and the characteristics of the TV set or display. Data stored in the storage device 373 can also include one or more sets of audio samples to be played back during the discovery phase. For example, the audio samples can be speech instructions or other types of audio. One or more picture sequences can also to be stored and retrieved in the storage device 373 for use during the discovery phase.

In one embodiment, data stored, written, and retrieved from storage device 373 includes one or more images to be displayed as a graphical picture during a discovery phase to determine the type of TV set or display attached to the DHCT 16 and the characteristics of the same. Data stored in the storage device 373 can also include one or more sets of audio samples to be played back during the discovery phase. One or more picture sequences can also to be stored and retrieved in the storage device 373 for use during the discovery phase. The storage device 373 can include graphical pictures and video picture sequences of different characteristics such as pictures of different picture aspect ratios, different colorimetry, different gammas, and/or different pixel aspect ratio, among other characteristics. Distorted pictures and pictures with, for example, side blank pillars, blank top and bottom rectangular regions, or a box with blanked rectangular regions may also be stored in the storage device 373 for employment during the discovery phase.

The DHCT 16 includes memory 349, which includes volatile and/or non-volatile memory, for storing various applications, modules and data for execution and use by the processor 344. Basic functionality of the DHCT 16 is provided by an operating system 353. Among other things, the operating system 353 includes a resource manager 367 that provides an interface to resources of the DHCT 16 such as, for example, computing resources, and a broadcast file system (BFS) client 343 that cooperates with the BFS server 202 (FIG. 2) to receive data and/or applications that are delivered from the BFS server 202 in a carousel fashion. The operating system 353 further includes one or more device drivers, such as device driver 311, that works in cooperation with the operating system 353 to provide operating instructions for communicating with peripheral devices.

Data to be used during the discovery phase can be transmitted to and received by the DHCT 16 as one or more files using the broadcast file system (via BFS server 202 (FIG. 2) and BFS module 343). Data can further be stored in the storage device 373 prior to exercising the discovery phase.

One or more programmed software applications, herein referred to as applications, are executed by utilizing the computing resources in the DHCT 16. Note that an application typically includes a client part and a server counterpart that cooperate to provide the complete functionality of the application. The applications may be resident in memory 349 or the storage device 373, or stored in a combination of memory 349 and storage device 373. Applications stored in memory 349 (or storage device 373) are executed by the processor 344 (e.g., a central processing unit or digital signal processor) under the auspices of the operating system 353. Data required as input by an application is stored in memory 349 or the storage device 373 (or a combination) and read by the processor 344 as needed during the course of the application's execution.

Input data may be stored in memory 349 by a secondary application or other source, either internal or external to the DHCT 16, or possibly anticipated by the application and thus created with the application at the time it was generated as a software application. Data generated by an application is stored in memory 349 by the processor 344 during the course of the application's execution, or if required, transferred to the storage device 373 from memory 349 by the processor 344 during the course of the application's execution. The availability of data, location of data, whether in memory 349 or in the local storage device 373, and the amount of data generated by a first application for consumption by a secondary application is communicated by messages. Messages are communicated through the services of the operating system 353, such as interrupt or polling mechanisms or data sharing mechanisms such as semaphores.

An application referred to as a navigator 355 is resident in memory 349. The navigator 355 provides a navigation framework for services provided by the DHCT 16. For instance, the navigator 355 includes core functionality such as volume and configuration settings. The navigator 355 preferably handles signals invoked from the channel navigation buttons on the remote control device 380.

The memory 349 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357. Note that in some embodiments, one or more of the platform library components may be resident in the operating system 353. The window manager 359 provides a mechanism for implementing the sharing of the display device screen regions and user input. The window manager 359 in the DHCT 16 is responsible for, as directed by one or more applications, implementing the creation, display, and de-allocation of the limited DHCT screen resources. It allows multiple applications to share the screen by assigning ownership of screen regions, or windows.

The window manager 359 also maintains, among other things, a user input registry 350 in memory 349 so that when a user enters a key or a command via the remote control device 380 or another input device such as a keyboard or mouse, the user input registry 350 is accessed to determine which of various applications running on the DHCT 16 should receive data corresponding to the input key and in which order.

The SAM client 357 is a client component of a client-server pair of components, with the server component being located in the headend 11, typically in the control system 232 (FIG. 2), although not shown. A SAM database 360 (i.e. structured data such as a database or data structure) in memory 349 includes a data structure of services and a data structure of channels that are created and updated by the headend 11. Herein, database will refer to a database, structured data or other data structures as is well known to those of ordinary skill in the art. The SAM client 357 also interfaces with the resource manager 367 to control resources of the DHCT 16. Many services can be defined using the same application component, with different parameters. Examples of services include, without limitation and in accordance with one implementation, presenting television programs (available through a WatchTV application 362), pay-per-view events (available through a PPV application (not shown)), digital music (not shown), media-on-demand (available through an MOD application (not shown)), and an interactive program guide (IPG) (available through an IPG application 397).

In the example DHCT 16 depicted in FIG. 3A, memory 349 also includes a web browser application 366 for providing web browsing services and a personal video recording (PVR) application 377 for providing personal video recording services. It should be clear to one with ordinary skill in the art that these applications are not limiting and merely serve as examples for this present embodiment of the disclosure. These applications, and others provided by the cable system operator, are top level software entities on the network for providing services to the user.

An executable program or algorithm corresponding to an operating system (OS) component, or to a client platform component, or to an application, or to respective parts thereof, can reside in and execute out of memory 349 and/or the storage device 373. Likewise, data input into or output from any executable program can reside in memory 349 and/or the storage device 373.

IV. Example Method for Determining Display Device Characteristics

As described above, there are many possible video formats that are received by the DHCT 16 and converted to a television signal compliant with the appropriate video interface specification for the respective port of the physical output ports 340. For example, ATSC includes 18 different video formats, which include parameters for the amount of active lines, total lines, horizontal pixels (e.g., pixels per line), aspect ratio (e.g., 16:9 or 4:3), vertical rate, frame rate, scan type (progressive or interlaced), and type of TV set (e.g., SDTV or HDTV) that a particular format is best suited for. For a TV set capable of sourcing a TV signal through more than one video interface or with a video interface that supports more than one video format, the nature of the picture displayed on a TV screen (or other display screen) can vary depending on what format the DHCT 16 configures the output signal (e.g., output from the output ports 340 to the TV set 341) to be. Accurate assumptions about the characteristics of the TV set 341 or display can be made based on the nature of the picture displayed in response to the video format of the television signal fed to the TV set 341 from the DHCT 16. Although the DHCT 16 does not know what type of TV set it is connected to, nor the characteristics of that TV set, it can output some predefined video formats and query the user about what he or she sees. Based on the response of the user, not only can the DHCT 16 determine the characteristics of the TV set connected (e.g., aspect ratio, color temperature, gamma characteristics, etc.), but also provide for a fine tuning of the picture quality that improves what the user sees. Note that in some embodiments some of these characteristics may be input by the user in response to a query by the DHCT 16 (e.g., the DHCT 16 can prompt questions on the TV display, such as "what type of TV do you have? year made? model number? manufacturer?," etc.).

Even if characteristics are input by a user, a discovery phase may still be employed where, for example, a TV set 341 has multiple interfaces to receive the output TV signal from the DHCT 16 and the user may have pre-configured the TV set 341 to a user-specific set of preferences. For instance, a user may opt to pre-configure a TV set 341 with a physical screen (e.g., the glass portion of the screen, screen portion of a projection TV, etc.) having a 4:3 aspect ratio using the TV set's settings to display a 16:9 TV signal received from the DHCT 16 in one of multiple configurable displayable ways. That is, the user can set a 16:9 TV signal to be displayed as, for example, a letterboxed picture (e.g., blank top and bottom portions envelope picture), as a distorted picture, or as a full-screen picture without distortion but with the left- and right-most portions cropped.

An interactive session(s) (or application(s)) that serves as a discovery phase according to an embodiment of the disclosure is executed upon power-up, or at other times such as when the user hooks up a different TV set to the DHCT 16, to determine the capabilities of the TV set 341 coupled to the DHCT 16. The discovery phase can be viewed as comprising two phases. Phase I includes determining how the TV set 341 can be driven. The TV set 341 can be a high definition television (HDTV) set, a national television systems committee (NTSC) set, or a PAL set. It is in phase I that the sourced TV signal received at the tuner system 345 of the DHCT 16 is mapped to a corresponding output of the DHCT 16 (and thus corresponding input of a TV set 341). For example, through one or more interactive sessions with the user, the DHCT 16 (or user) may decide that when the DHCT 16 is tuned to SD (standard definition) or NTSC channels, the signal is to be processed and fed through the baseband port or S-video port of the physical output ports 340. Similarly, if the DHCT 16 is tuned to an HD channel, the DHCT 16 (or user) may determine that the signal is to be processed and fed through the YPbPr port or the DVI port of the physical output ports 340. Phase II includes determining additional characteristics of the TV set 341, which serves as a calibration process. For example, it is in phase II that the color temperature, gamma characteristics, and/or de-interlacing characteristics or capabilities, among others, can be verified or determined.

Figure 4:
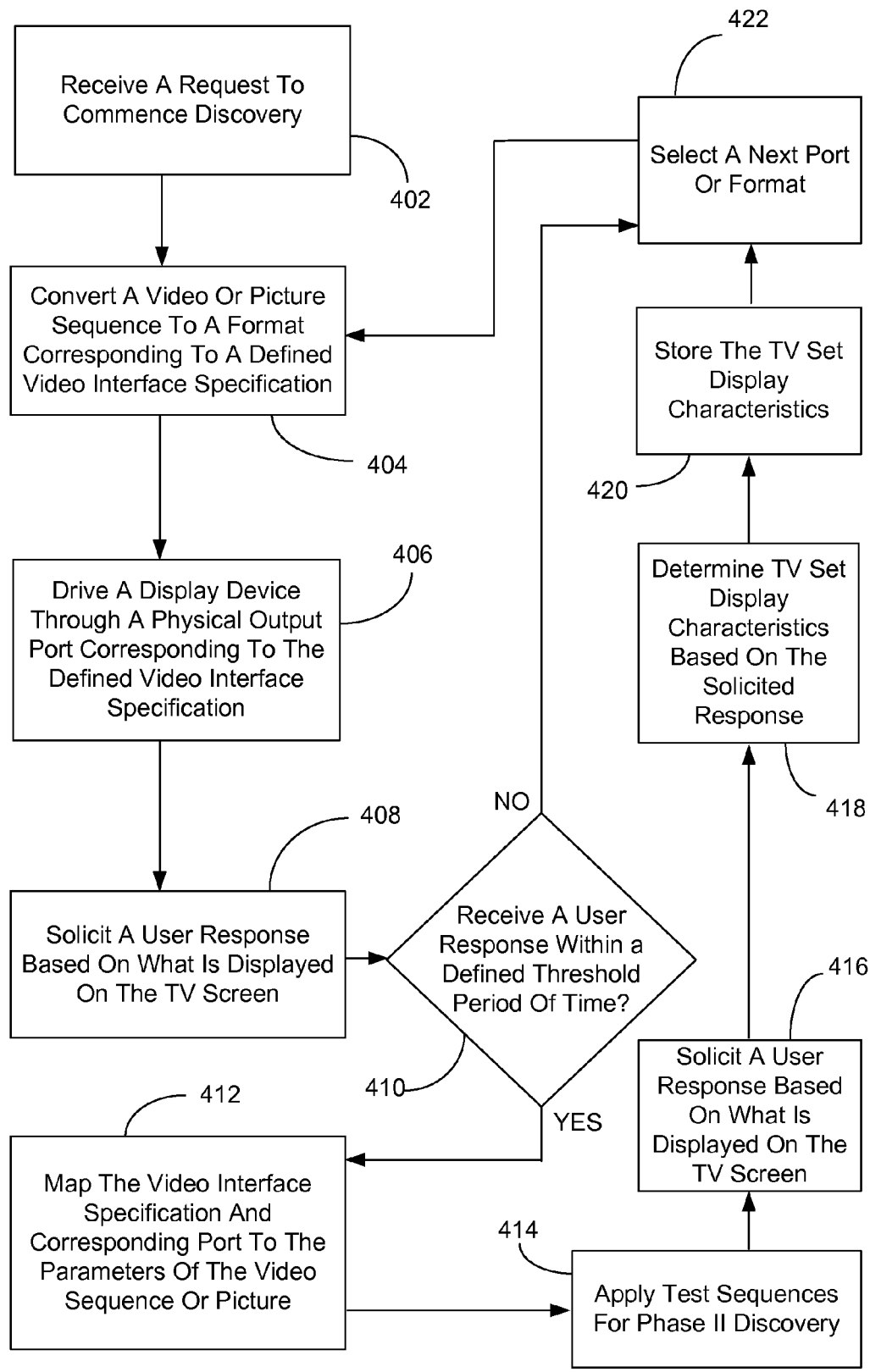
FIG. 4 is a flow diagram depicting an example method for determining display device characteristics, in accordance with one embodiment of the disclosure.

FIG. 4 is a flow diagram of one example method for implementing phase I and phase II of the discovery phase, in accordance with one embodiment of the disclosure. The blocks in the flow diagram of FIG. 4 should be understood as representing modules, segments, or portions of code which include one or more executable instructions for implementing specific logical functions or steps in the process. Alternate implementations are included within the scope of the preferred embodiments of the present disclosure in which functions may be executed out of order from that shown or discussed, including substantially concurrently or in reverse order, or with additional steps or steps omitted, depending on the functionality involved, as would be understood by those reasonably skilled in the art of the present disclosure.

Referring to FIG. 4, and with continued reference to FIG. 3A, step 402 includes receiving a request to commence discovery. The discovery phase can be invoked using a dedicated key or button in the remote control device 380 (FIG. 3B), such as the TV capabilities query button 381 (FIG. 3B). An interactive session can also be accomplished through a quick settings user interface screen (e.g., not shown, but evoked by the user selecting the quick settings button 387, FIG. 3B) or through a general settings screen (e.g., not shown, but evoked by the user navigating through menu items upon pressing the menu button 388, FIG. 3B).

Step 404 includes converting a video or picture sequence according to a defined video interface specification. Representative pictures or video sequences that include the different video formats in ATSC A/54 or SCTE 43, for example, which vary in parameters such as aspect ratio (e.g., 4:3 versus 16:9), TV type (e.g., SDTV versus HDTV), among others, are used during the discovery phase. The video formats are processed for output by appropriately exercising conversion capabilities in the TV output system 331 according to defined categories of parameters for a video output interface and to provide some efficiency in the driving of outputs. The pictures or video sequences (and/or audio) can be provided by the DHCT 16 as a result of real-time or time-shifted (e.g., buffered to the storage device 373) conversion of a TV signal received from the network 18 (FIG. 1). Preferably, picture or video sequence samples of various parameters are stored in the storage device 373 and provided by the DHCT 16 during the discovery phase. For example, these samples can be downloaded to the storage device 373 upon receipt via the BFS module 343 or downloaded by the DHCT manufacturer. Additionally, graphics, video, or a combination of graphics and video can be provided during the discovery phase according to the mechanisms described in association with FIG. 3A.

Step 406 includes driving one or more display devices through the physical output port with a video format corresponding to the video interface specification to which the conversion in step 404 was implemented. The DHCT cycles through each video format in response to the user selecting the cycle button 383, or in alternative embodiments, automatically for a defined interval of time, requesting input from the user for each format. The display manager 335, in cooperation with the media engine 330, the operating system 353, memory (e.g., memory 349 and/or media memory 329), and the processor 344, preferably is responsible for cycling the various video formats through the output connections 340 to the inputs of the TV set 341. The cycle is preferably set from the highest resolution to the lowest resolution. For example, the DHCT may output 1080i first, and then output 720p, then 480p, and then 480i. Once a user enters input, it is assumed that the TV set 341 is to be driven at the highest resolution format to minimize degradation of the highest resolution TV set that is sourced. Driving the TV set with a common video format simplifies graphics overlay management by the display manager 335 and operating system 353 as it shortens development cycle and reduces provisions required to support legacy applications. In some embodiments, the DHCT 16 can transmit audio instructions in addition to or in lieu of the video and/or graphics data.

Step 408 includes soliciting a user response based on what is displayed on the TV screen. In one embodiment, the display manager 335, in cooperation with the processor 344, can cause the generation and presentation of various GUI screens to solicit help from a user to determine the type of inputs that are supported by the TV set 341. One purpose for driving the inputs of the TV set 341 is to present a picture on the screen of the TV set 341 along with a GUI screen that enables the user to comment on whether he or she sees any picture on the display. Note that in other embodiments, audio instructions (e.g., such as speech instructions) can be used, alone or in combination with graphics and/or video, to solicit user feedback and/or provide instruction which would facilitate the determination of how the TV set 341 can be driven.

Step 410 includes determining whether user input was received within a defined period of time defined by a fixed or programmable threshold. The failure to receive an inputted response from the user may indicate that the user did not see a screen (e.g., there may not be a connection made by the user or the particular video format cycled through the output port is not supported). If a video format applied to the TV set input was not compatible with the TV set (e.g., a video format that is not compatible with the scan format or other characteristics of the TV set 341), or no connection has been made between the DHCT port and the corresponding TV set port, an out-of-synch picture is likely to be displayed. If the DHCT 16 determines that no user input is received within a predetermined or defined period of time of driving the TV set with a signal having a prescribed video format, the DHCT 16 automatically selects a new port, or another video format for the same output port (e.g., if more than one video format is supported by the selected output port) (step 422), and repeats the process starting at step 404. In some embodiments, selection of the next port is not automatically initiated until a user enters input, regardless of whether instructions or other messaging on the screen is viewable or not, thus omitting the determination step (step 410). For example, instructions in a written user's guide (or by phone) can require a user to enter one type of input (e.g., the cycle button 383, FIG. 3B) when the video is out-of-synch (e.g., instructions do not appear), and another type of input (e.g., the select button 387, FIG. 3B) when the displayed picture and/or instructions are coherent (e.g., observable and/or legible). In some embodiments without the automatic feature, the determination step may still be employed.

The programmable threshold that defines the period of time for cycling through the video formats and/or output ports may be programmed and stored in NVM 348 of the DHCT 16. Alternatively, the threshold value can be stored in the storage device 373 of the DHCT 16 or in NVM (not shown) in the remote control device 380. Programming of the threshold value can be performed at a manufacturing facility, by a cable operator from the headend 11 while the DHCT 16 is at a subscriber's or user's premise, or by the subscriber or user.

If a GUI is viewable, suggesting that the cycled video format is both established through a valid connection to the TV set 341 and that the TV set 341 can be driven using that applied video format, step 412 includes mapping the video interface specification and corresponding port with a parameter or parameters of the TV signal, video sequence or picture. In other words, the DHCT 16 stores in memory (e.g., media memory 329, memory 349, and/or the storage device 373, FIG. 3A) the parameter(s) or settings required to operate the video display pipeline 338 and/or graphics display pipeline 339, the functions in the output system 331, and the output ports 340 to effect the processing and output of a TV signal according to the parameters of each possible TV signal format that DHCT 16 is capable of receiving via its tuner system 345 (FIG. 3A) or an input or communication port. In addition to storing the parameters and settings required to process and output each respective TV signal format, the DHCT 16 stores a table (not shown) that associates each possible TV signal format to one or more designated output ports 340. For example, for TV signals that have parameters that indicate the signal originated in or is otherwise compliant to an HD transmission medium, the DHCT 16 determines the parameters of the received TV signal by, for example, processing information in the signal and comparing the information with information stored in the SAM database 360. The SAM database 360 may include stored information in an association table (not shown) that maps the TV signal to a designated output port. The DHCT 16 then converts the TV signal, and drives the converted TV signal through the designated port (e.g., YPbPr port) of the physical output ports 340.

For formats where a display is generated and viewable by the user, additional formats can be presented through this interactive session to fine-tune what the user is viewing. Step 414 includes applying test sequences for phase II discovery. For example, one category of driving the TV set inputs can be according to the scan format (e.g., interlaced versus progressive). Within an interlaced category, there are multiple video formats (e.g., with differences in resolution (e.g., 1080i, 480i, etc.), aspect ratio, among other parameters). If the TV set 341 has the capability to only receive an input with a progressive scan format, then driving it with an interlaced scan format may result in no displayable screen (e.g., a scrambled picture), thus negating the need to drive the TV set inputs with other video formats under the category of interlaced. The test sequences are received from memory in a manner as described above for step 402, and processed (e.g., altered) in the blitter 337 in cooperation with the display manager 335 and the processor 344 (FIG. 3A). In one embodiment, the samples are altered in a manner that causes images on the TV screen to be distorted and/or appear with a variety of features (e.g., cropped) and/or or omissions of features and/or accentuations in features or conditions (e.g., taking a circle and expanding in a vertical or horizontal orientation to create an ellipse). By altering the samples, a display screen comprising, in one embodiment, a GUI and an altered image sample, can be presented that enables the DHCT 16 to determine how the TV set 341 reacts to or presents these altered images based on the user response. Some of the samples stored in the storage device 373 can be altered samples, or in some embodiments, the alterations can be implemented in the media engine 330 or via a combination of stored altered samples and processing in the media engine 330.

Step 416 includes soliciting a user response based on what is displayed on the TV screen. Based on the video format selected and the alteration imposed in step 414, there is an expected effect on the picture presented on the TV screen, and this expected effect is used to generate the appropriate question to the user on the display screen to help determine the characteristic of the TV set 341 (FIG. 3A) the question was geared to find. Soliciting a user response can also include requesting user preferences. For example, the user may be presented with alternate pictures having different colors and asked to choose a preferred color.

Step 418 includes determining characteristics of the display device based on the solicited user response. Running through interactive screens shown in FIGS. 5-8 (and other screens not shown) and soliciting answers to the questions presented in these screens enables the DHCT to determine the capabilities of the TV and allows the user alternate display options of video and graphics throughout the course of viewing the picture in the display screen of the TV set 341. Hence, the user has a mechanism for selecting a video format for the video (and graphic) that the viewer can simply invoke for different sourced video signals. This allows the user the flexibility to display a sourced picture of a certain aspect ratio to the aspect ratio of the TV set or in a manner the user chooses. For example, the preferred embodiments of the disclosure allows the viewer to expand a sourced 4:3 content out to the edges of a 4:3 HDTV (i.e., full screen rather than a boxed in display).

Step 420 includes storing the TV set display characteristics. One or more non-volatile memory (NVM) bits (not shown) in memory 349 (or the characteristics can be stored in the storage device 373, FIG. 3A) (FIG. 3A) are assigned to denote a default value: "never set" or "set". Once set, the capabilities of the connected TV set 341 are retained in NVM 348. If the user employs a different TV set in the future, the interactive sessions of the preferred embodiments of the disclosure can be re-entered via the TV capabilities query button 381, general settings, quick settings, front key input on the DHCT 16, or via other buttons on the remote control device 380 (FIG. 3B) using key sequences as explained in a user's manual.

Step 422 includes selecting another port or another format for the same port, and then the discovery process is repeated again beginning at step 404.

Therefore, during an interactive session that requests input from the user, the DHCT 16 cycles through each video format requesting input from the viewer rather than merely terminating when a first video format category suitable for driving the TV set 341 is determined Hence, the input from the user preferably does not cease after the user acknowledges being able to view a first viewable display screen, but rather after completion of cycling through all or substantially all video formats.

Note that in some embodiments, phase I can be implemented for all ports and completed before commencing phase II.

Also, in some embodiments, the user may decide on which output port of the physical output ports 340 (FIG. 3A) to output each possible picture format of the input, incoming or tuned TV signal. For instance, a user may express his or her preferences in interactive sessions during the TV capability discovery phase to output an incoming TV (video) signal through an output port capable of outputting the scan rate equivalent to the scan rate of the incoming TV signal. Furthermore, the user may decide through the interactive sessions to select an output port for each respective TV channel in the channel line-up, assuming that the user knows the picture format of each channel or that the interactive session displays information on the screen containing the picture format associated with each channel to the user. User preferences are stored in memory, for example memory 349 (FIG. 3A), and/or the storage device 373 (FIG. 3A).

The picture format associated with each channel may be known a priori. For example, the picture format may be obtained or inferred by the processor 344 (FIG. 3A) from the record of each program in an EPG or IPG database (not shown) residing in memory 349 (FIG. 3A), or from information associated with each service or TV channel in the SAM tables (e.g., SAM database 360, FIG. 3A) residing in memory 349. Alternatively, the DHCT 16 (FIG. 3A) may determine the picture rate for each TV channel, service or program by tuning to each channel in the channel line-up. Since the picture rate for a TV channel may change through the course of time, the user may further prefer to allow the DHCT 16 to dynamically switch output ports according to the incoming TV signal's picture format.

The discovery phase retains (e.g., by saving in memory 349, FIG. 3A) the output formats or modes that the DHCT 16 (FIG. 3A) is capable of outputting. A user may opt to eliminate one or more output capability from the plurality of output capabilities found during the discovery phase. During normal TV watching operation, the user has access to select any of the retained outputting modes (e.g., via quick settings or a remote key). The DHCT 16 may be configured to output in one picture format (e.g., 1080i) or to dynamically adjust to output according to the picture format of the incoming TV signal. Regardless of whether the DHCT 16 outputs in a fixed format indefinitely, the user has access to the list of retained output modes and select an alternate output mode from the list.

In one embodiment, wherein the output mode is fixed to a first picture format, once the user selects an alternate output format from the list of retained output modes, the DHCT 16 (FIG. 3A) continues to output the alternate output format indefinitely until the user once again selects another output mode (e.g., possibly the first picture format). In an alternate embodiment, when the user tunes to a different channel, the DHCT 16 discontinues outputting the alternate output format by reverting to output the first picture format.

V. Interactive Session Display Screens

Figure 5:
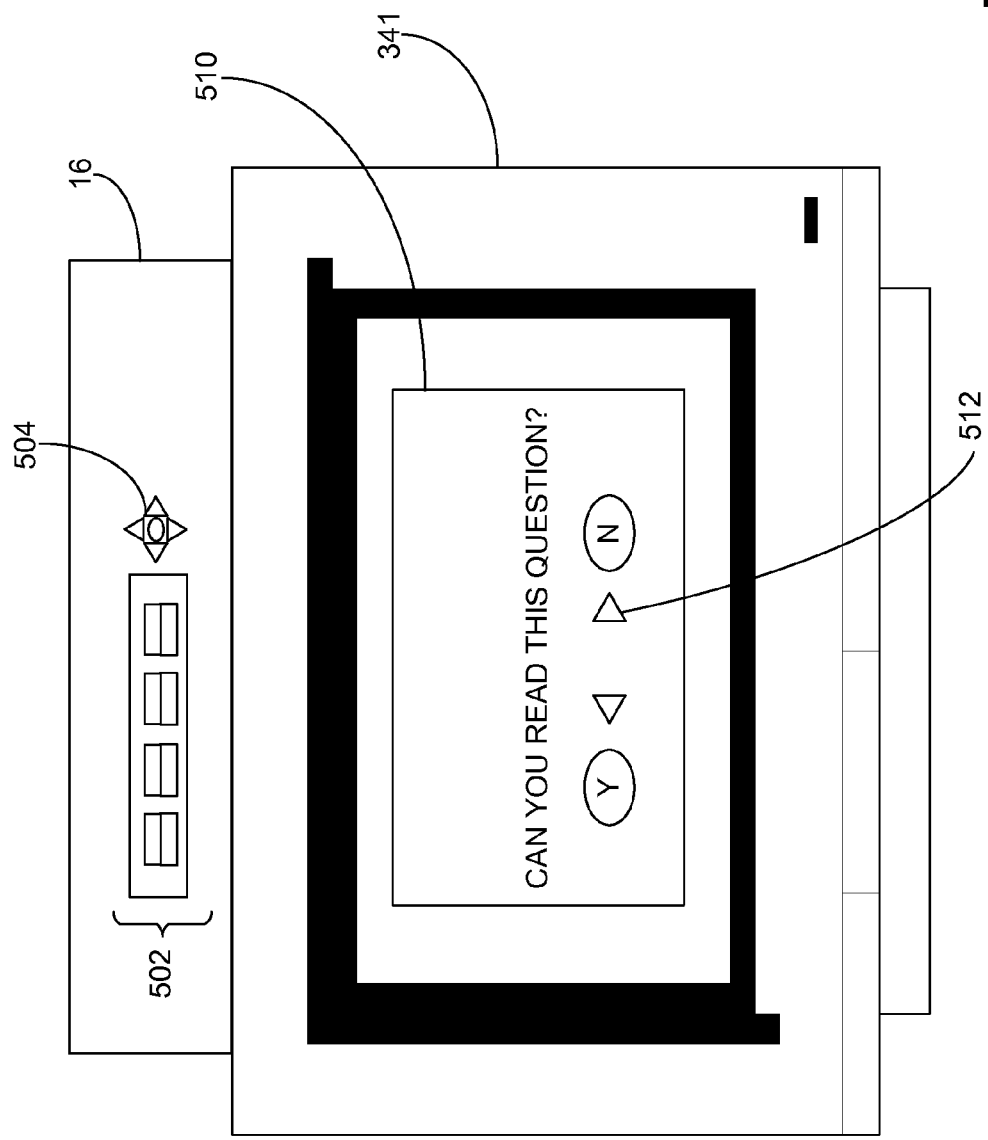
FIGS. 5-7 are block diagrams of the example DHCT and the television set shown in FIG. 3A with a display screen that solicits user feedback based on a plurality of output formats from the DHCT to the TV set, in accordance with one embodiment of the disclosure.

FIG. 5 is a block diagram of one arrangement for the TV set 341 and the DHCT 16. The DHCT 16 includes a digital display 502 and navigation buttons 504 for performing navigational functions like channel changing, etc. For example, the user can select the navigation buttons 504 to select information in response to a DHCT prompted GUI screen 510 during phase I discovery. Presumably, a GUI screen 510 is presented because a connection between the DHCT port and corresponding connection at the TV set 341 has been made and a video format was input to the TV set input or inputs with which the TV set 341 is compatible. As shown, a text message in the display screen 510 queries the user, "Can you read this question?" The user will enter input if he or she is able to read the question. The display screen 510 suggests through the use of navigation arrow icons 512 that the user can select the navigation buttons 385 on the remote control device 380 (FIG. 3B) or the DHCT navigation buttons 504. One skilled in the art will understand that other buttons can be used to convey a user response, including the use of just the select button 387 (FIG. 3B).

Figure 6:
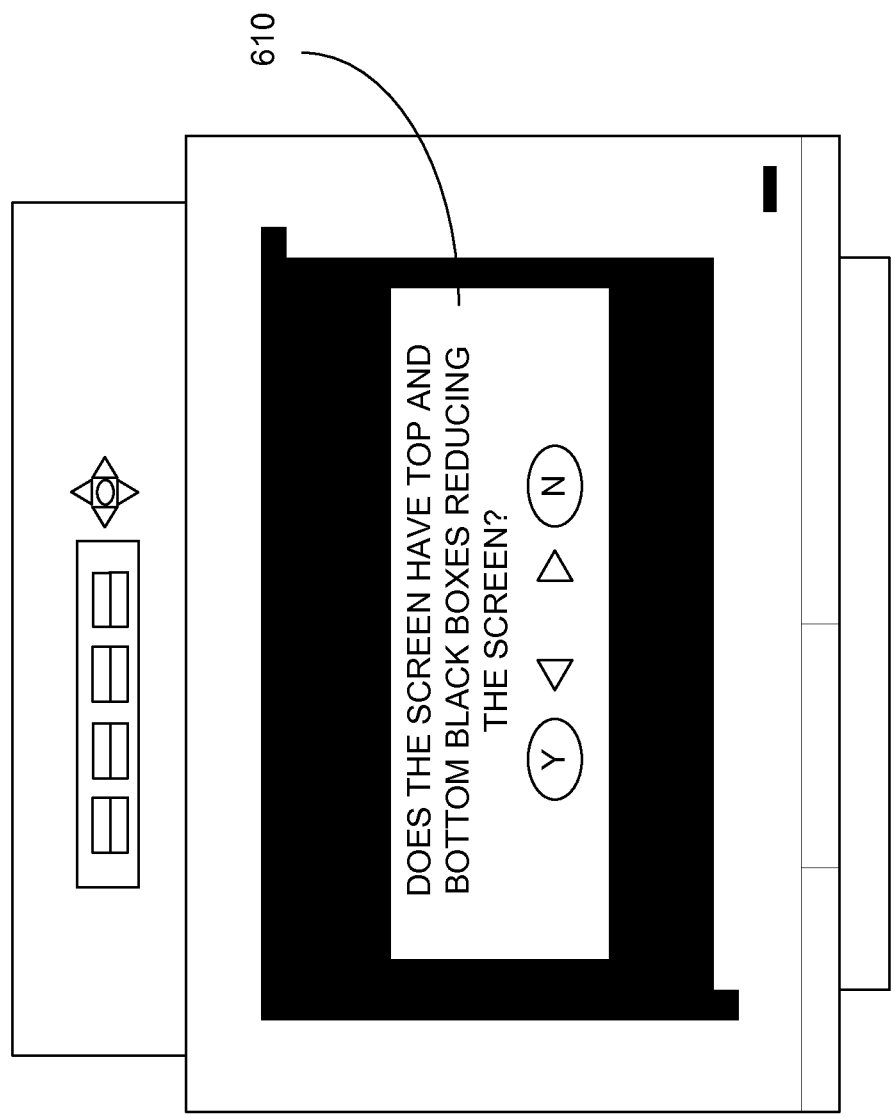
Figure 7:
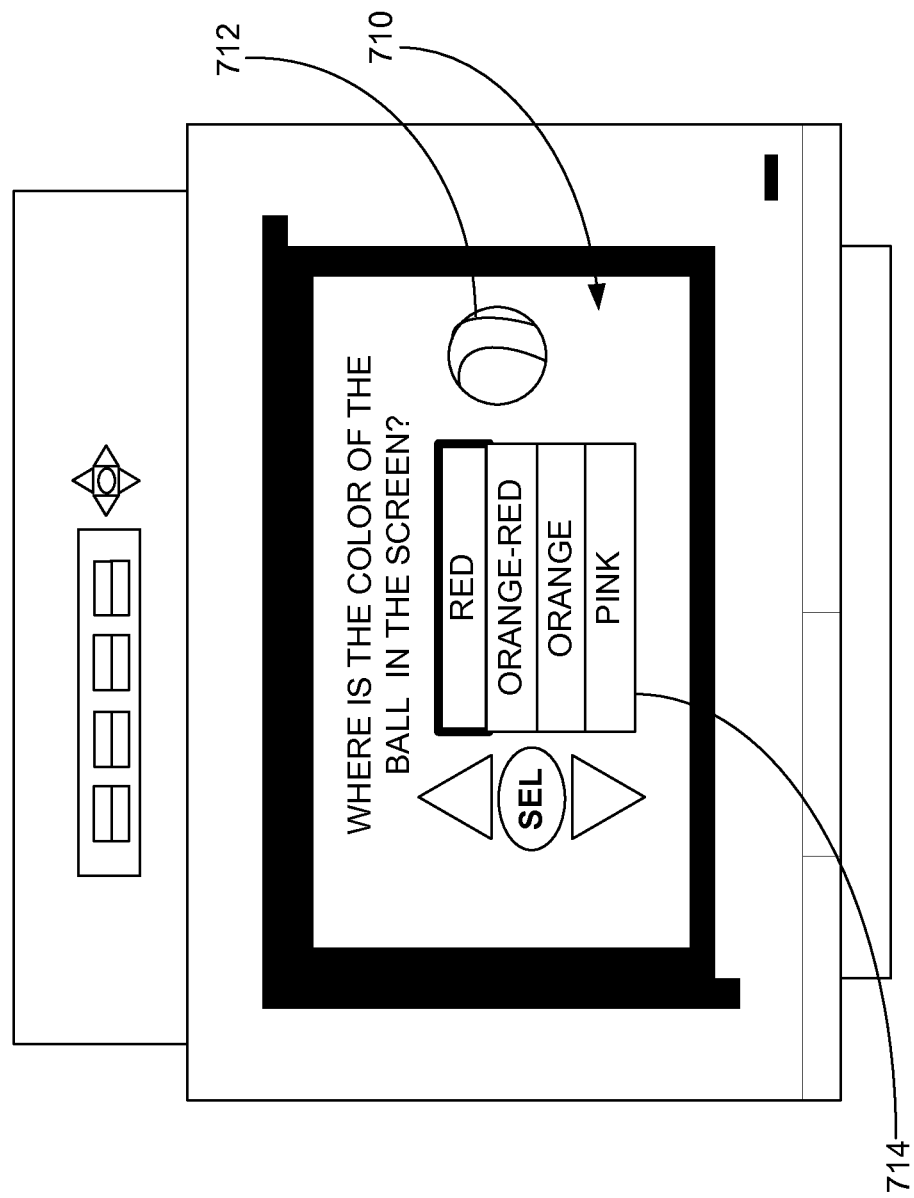

As is shown in FIGS. 6-7, a set of display screens tailored for each combination of video format and display aspect ratio are generated for each respective video format during phase II discovery. Continuing with the example referenced in association with FIG. 4, within the generalized category of a respective scan mode (e.g., progressive versus interlaced), the picture is output in multiple ways to find out further capabilities of the TV set 341. This process includes outputting different aspect ratios such as 16:9, 4:3, or others, as well as embedding a graphical picture within the picture (e.g., letterbox or sidebars). The user may have set the TV set 341 to display letterbox, for example, or there may be a default setting. The user may also configure settings in the DHCT 16 for handling the aspect ratio in a predetermined manner. Thus, there may be cumulative operations performed by the DHCT 16 and the TV set 341 that cause distortions of objects to be amplified (e.g., a ball on the screen may be stretched by operations in the DHCT 16 and then further stretched due to operations in the TV set 341). Images stored in the storage device 373, for example, may be presented at the TV set 341 in a distorted and non-distorted manner to determine these settings. The phase II discovery process also includes outputting graphics with alternate lines displaced or shifted by varied amounts to determine if the TV set 341 has a de-interlacer and if so, what is its quality. Graphical objects in the graphical picture may represent certain geometrical shapes subjected to any of a plurality of 2-D or 3-D transformations that include rotation, scaling, shear and perspectives, among others, that when coupled to alternate line displacements of shift that emulate motion from an interlaced camera, help identify the performance of the de-interlacing capabilities of a de-interlacer. For example, the DHCT 16 may test the quality of the de-interlacer of the TV set 341 to determine if de-interlacing functionality in the DHCT 16 should be bypassed due to superior quality of the de-interlacer in the TV set 341. De-interlacer assessment may be further refined to determine which of two de-interlacers performs best for analog signals, for interlaced SD pictures received as compressed digital signals, and/or for interlaced HD pictures received as compressed digital signals. Note that a TV set may feature "multi-synch" support. For example, an HDTV set may support multiple video formats at its input. In such event, it may be desirable to drive the HDTV set with the native scan format of the sourced input signal to minimize picture degradation.

FIG. 6 illustrates a query that is aimed towards determining how the TV set 341 handles certain aspect ratios. For example, a signal received from the headend 11 (FIG. 2) may carry content at a 4:3 aspect ratio, although the connected TV set is an HDTV having a 16:9 aspect ratio. One way the HDTV set handles this source signal could be to provide black vertical stripe boxes on the side of the 4:3 screen. An interactive session can help the DHCT 16 determine what is connected by the way the TV set handles the displayed picture. As shown, the video format inferred here is handled by the TV set 341 by outlining the picture in the display screen with top and bottom block stripes. The display screen 610 includes a text message that asks the user, "Does the screen have top and bottom black boxes reducing the screen?" Depending on the response to this question, a series of screens can be presented that ask similar questions, such as whether the user sees side block stripes, or a boxed-in picture. In other embodiments, a single screen instruction can ask all of these questions, which are aimed at trying to ascertain the aspect ratio of the TV set 341.

FIG. 7 is a block diagram illustrating another interactive display screen 710 used to fine tune the color quality. As shown, input is requested on the color of a graphical object (although it could be colored-text as well) in the display to ascertain the color temperature of the TV set display. For example, the graphical object, generated internally to the DHCT 16, is a ball 712, and the question presented to the user is, "what is the color of the ball in the screen?" A scrollable color-choice list 714 can be presented, which gives the user a choice of colors to choose from to enable the user to adequately describe the color of the ball.

Other questions can be presented to determine other characteristics. For example, input can be requested from the user on whether visible flicker or certain artifacts are visible to determine if the TV set has an internal line-doubler (i.e., de-interlacer) or to assess the quality of the line doubler versus that of the line doubler of the DHCT 16. Additional questions can be presented to the user to provide user preferences on border color or shade (e.g., the letterbox may be available with different shades of gray to cause the picture brightness to vary and thus enhance the viewer experience).

Additional embodiments can be used for this interactive session between the user and the DHCT 16. In one embodiment, synthesized audio can be played while cycling through the video formats, instructing the user to enter input without any dependence on a displayed GUI. In another embodiment, synthesized audio can be played with a displayed GUI in each cycled video format, and in some embodiments, synthesized audio is repeated if the user's input is not received after an elapsed time greater than a predetermined threshold.

Some embodiments may employ buttons on the DHCT 16 (e.g., light-emitting diodes, or LEDs, such as digital display 502 (FIG. 5)) in lieu of or in addition to the display screens. For example, since some HDTVs and projectors have common inputs that may not accept 1080i signals, the LEDs may be used where on-screen graphics is not readable (e.g., if the scan is not correct). Possible scan values include 1080i, 720p, 480p, and 480i. When NVM values are cleared during staging (e.g., initial installation), the scan value from a staging configuration file may be set. If the staging configuration file does not contain the scan value parameter, 1080i will be set. Most HDTVs will accept the 1080i scan format, so that may be the default value. Other settings may be available using a front panel settings key (not shown). For example, by holding down a settings key for a predetermined period of time, a message light may blink and the LED digits may reveal the current setting. In some embodiments, a scan barker (not shown) may be displayed. Pressing the settings key again may cycle the settings.

The display manager 335 can be implemented in hardware, software, firmware, or a combination thereof. In the preferred embodiment(s), the display manager 335 is implemented in software or firmware that is stored in a memory and that is executed by a suitable instruction execution system. If implemented in hardware, as in an alternative embodiment, the display manager 335 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The display manager 335, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present disclosure, particularly, any "preferred embodiments" are merely possible examples of implementations, merely setting forth a clear understanding of the principles of the disclosures. Many variations and modifications may be made to the above-described embodiments of the disclosure without departing substantially from the spirit of the principles of the disclosure. All such modifications and variations are intended to be included herein within the scope of the disclosure and present disclosure and protected by the following claims.

What is claimed is:

1. A system, comprising:
processing logic of a client device configured to effect the presentation of objects on a display screen of a display device coupled to the client device that are altered by one or more pipelines, the processing logic of the client device configured to solicit a response by a user, the processing logic of the client device further configured to, responsive to the response from the user, determine de-interlacing capabilities of the display device coupled to the client device, the processing logic of the client device further configured to determine de-interlacing capabilities of the client device and then determine if the de-interlacing capabilities of the client device should be bypassed in favor of the de-interlacing capabilities of the display device.

2. The client device of claim 1, wherein the display device includes a television set.

3. The system of claim 1, wherein the one or more pipelines further comprises:
a media memory configured to store one or more consecutive interlaced pictures; and circuit logic configured to:
access an interlaced picture from the memory;
process a plurality of lines from a field corresponding to the interlaced picture; and
generate each line of a resulting progressive picture.

4. The client device of claim 3, wherein the processing logic is further configured to affect a display of the progressive picture on the display screen and solicit further user response based on a perceived quality of the display of the progressive picture.

5. The client device of claim 4, wherein the processing logic is further configured to determine whether the de-interlacing capabilities of the client device or of the display device should be used based on the further user response, wherein the processing logic is further configured to responsively implement the de-interlacing capabilities of the client device or of the display device.

6. The client device of claim 3, wherein the processing logic is further configured to determine the de-interlacing capabilities based on an input corresponding to analog signals, interlaced standard definition (SD) pictures received as compressed digital signals, interlaced high definition (HD) pictures received as compressed digital signals, or a combination of two or more.

7. The client device of claim 3, wherein the circuit logic is programmable.

8. The client device of claim 1, wherein the one or more pipelines further comprises:
a media memory configured to store one or more consecutive interlaced pictures; and circuit logic configured to:
access plural interlaced pictures from the media memory;
process a plurality of lines from plural field corresponding to the plural interlaced pictures; and
generate each line of resulting plural progressive pictures.

9. The client device of claim 8, wherein the processing logic is further configured to affect a display of the plural progressive pictures on the display screen and solicit further user response based on a perceived quality of the display of the plural progressive pictures.

10. The client device of claim 9, wherein the processing logic is further configured to determine whether the de-interlacing capabilities of the client device or of the display device should be used based on the further user response.

11. The client device of claim 8, wherein the processing logic is further configured to determine the de-interlacing capabilities of the client device or of the display device based on an input corresponding to analog signals, interlaced standard definition (SD) pictures received as compressed digital signals, interlaced high definition (HD) pictures received as compressed digital signals, or a combination of two or more.

12. The client device of claim 8, wherein the circuit logic is programmable.

13. The client device of claim 1, wherein the processing logic is embodied in a network client device capable of outputting video and audio in at least one defined format through at least one port.

14. The client device of claim 1, wherein the processing logic is further configured to determine the de-interlacing capability of the display device by affecting an output to the display device of graphical objects with alternate lines displaced or shifted by varied amounts based on operations of the one or more pipelines.

15. The client device of claim 14, wherein the determination of de-interlacing capabilities of the display device includes a determination of whether the display device has de-interlacing capabilities, the quality of the de-interlacing capabilities, or a combination of both.

16. The client device of claim 14, wherein the one or more pipelines are further configured to generate the graphical objects based on one or more two-dimensional transformations, one or more three-dimensional transformations, or a combination of both.

17. A method, comprising:
altering one or more objects corresponding to one or more pictures;
de-interlacing by a client device one or more fields corresponding to the altered one or more objects;
outputting the altered objects and the de-interlaced altered objects on a display screen of a display device coupled to the client device;
soliciting user input to determine a quality of one or more rendered displays on the display screen, the one or more rendered displays based on the outputted altered objects that are de-interlaced at the display device and the de-interlaced altered objects provided by the client device;
determining via the client device de-interlacing capabilities of the display device coupled to the client device and de-interlacing capabilities of the client device; and
determining if the de-interlacing capabilities of the client device should be bypassed in favor of the de-interlacing capabilities of the display device.

* * * * *